(12) United States Patent
Asenjo et al.

(10) Patent No.: US 9,954,972 B2
(45) Date of Patent: Apr. 24, 2018

(54) INDUSTRIAL DATA ANALYTICS IN A CLOUD PLATFORM

(71) Applicant: Rockwell Automation Technologies, Inc., Mayfield Heights, OH (US)

(72) Inventors: Juan L. Asenjo, Timberlake, OH (US); John Strohmenger, Strongsville, OH (US); Stephen Thomas Nawalaniec, Southlake, TX (US); Bradford Henry Hegrat, Montville, OH (US); Joseph A. Harkulich, Willoughby, OH (US); Jessica Lin Korpela, Milwaukee, WI (US); Jenifer Rydberg Wright, Renton, WA (US); Rainer Hessmer, Rancho Santa Margarita, CA (US); John Dyck, Chardon, OH (US); Edward Alan Hill, Chagrin Falls, OH (US); Salvatore T. Conti, Olmsted Township, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/214,583

(22) Filed: Jul. 20, 2016

(65) Prior Publication Data

US 2016/0330291 A1 Nov. 10, 2016

Related U.S. Application Data

(63) Continuation of application No. 14/087,873, filed on Nov. 22, 2013, now Pat. No. 9,438,648.

(Continued)

(51) Int. Cl.
*G06F 15/16* (2006.01)
*H04L 29/08* (2006.01)
(Continued)

(52) U.S. Cl.
CPC .......... *H04L 67/306* (2013.01); *G06Q 10/06* (2013.01); *G06Q 10/0637* (2013.01);
(Continued)

(58) Field of Classification Search
None
See application file for complete search history.

(56) References Cited

U.S. PATENT DOCUMENTS 5,014,317 A 5/1991 Kita et al.
5,122,948 A 6/1992 Zapolin
(Continued)

FOREIGN PATENT DOCUMENTS

CN 101114160 1/2008
CN 101536002 9/2009
(Continued)

OTHER PUBLICATIONS

Non-Final Office Action for U.S. Appl. No. 14/087,922, dated Jul. 19, 2016, 120 pages.
(Continued)

*Primary Examiner* — Brian Whipple
(74) *Attorney, Agent, or Firm* — Amin, Turocy & Watson, LLP

(57) ABSTRACT

Cloud-aware industrial devices feed robust sets of data to a cloud-based data analyzer that executes as a service in a cloud platform. In addition to industrial data generated or collected by the industrial devices, the devices can provide device profile information to the cloud-based analyzer that identifies the device and relevant configuration information. The industrial devices can also provide customer data identifying an owner of the industrial devices, contact information for the owner, active service contracts, etc. The cloud-based data analyzer leverages this information to perform a variety of custom analytics on the data and generate reports
(Continued)

or notifications catered to the particular industrial assets' optimal performance and business goals of the owner's industrial enterprise, as well as perform real-time decision making and control.

20 Claims, 25 Drawing Sheets

Related U.S. Application Data

(60) Provisional application No. 61/821,639, filed on May 9, 2013.

(51) Int. Cl.
G06Q 10/06 (2012.01)
H04L 29/06 (2006.01)

(52) U.S. Cl.
CPC ............ *H04L 65/403* (2013.01); *H04L 67/10* (2013.01); *H04L 67/22* (2013.01); *Y02P 90/86* (2015.11)

(56) References Cited

U.S. PATENT DOCUMENTS

| | | |
|---|---|---|
| 5,199,009 A | 3/1993 | Svast |
| 5,611,059 A | 3/1997 | Benton et al. |
| 5,612,869 A | 3/1997 | Letzt et al. |
| 5,682,460 A | 10/1997 | Hyziak et al. |
| 5,710,885 A | 1/1998 | Bondi |
| 5,844,794 A | 12/1998 | Keeley |
| 5,845,149 A | 12/1998 | Husted et al. |
| 5,856,931 A | 1/1999 | McCasland |
| 5,978,568 A | 11/1999 | Abraham et al. |
| 6,167,337 A | 12/2000 | Haack et al. |
| 6,175,770 B1 | 1/2001 | Bladow |
| 6,175,801 B1 | 1/2001 | Millington |
| 6,199,068 B1 | 3/2001 | Carpenter |
| 6,279,113 B1 | 8/2001 | Vaidya |
| 6,282,455 B1 | 8/2001 | Engdahl |
| 6,324,607 B1 | 11/2001 | Korowitz et al. |
| 6,381,502 B1 | 4/2002 | Rudder et al. |
| 6,400,996 B1 | 6/2002 | Hoffberg et al. |
| 6,412,032 B1 | 6/2002 | Neet et al. |
| 6,437,692 B1 | 8/2002 | Petite et al. |
| 6,457,024 B1 | 9/2002 | Felsentein et al. |
| 6,463,338 B1 | 10/2002 | Neet |
| 6,535,926 B1 | 3/2003 | Esker |
| 6,578,005 B1 | 6/2003 | Lesaint et al. |
| 6,624,388 B1 | 9/2003 | Blankenship et al. |
| 6,640,145 B2 | 10/2003 | Hoffberg et al. |
| 6,651,062 B2 | 11/2003 | Ghannam et al. |
| 6,675,226 B1 | 1/2004 | Nair et al. |
| 6,686,838 B1 | 2/2004 | Rezvani et al. |
| 6,691,159 B1 | 2/2004 | Grewal et al. |
| 6,705,229 B2 | 3/2004 | Frankenberger |
| 6,708,074 B1 | 3/2004 | Chi et al. |
| 6,708,385 B1 | 3/2004 | Lemelson |
| 6,714,974 B1 | 3/2004 | Machida |
| 6,728,262 B1 | 4/2004 | Woram |
| 6,732,165 B1 | 5/2004 | Jennings, III |
| 6,732,191 B1 | 5/2004 | Baker et al. |
| 6,774,598 B1 | 8/2004 | Kohler et al. |
| 6,801,920 B1 | 10/2004 | Wischinski |
| 6,819,960 B1 | 11/2004 | McKelvey et al. |
| 6,891,850 B1 | 5/2005 | Vandesteeg et al. |
| 6,895,532 B2 | 5/2005 | Raynham |
| 6,904,600 B1 | 6/2005 | James et al. |
| 6,907,302 B2 | 6/2005 | Karbassi |
| 6,920,502 B2 | 7/2005 | Araujo et al. |
| 6,952,680 B1 | 10/2005 | Melby et al. |
| 6,965,802 B2 | 11/2005 | Sexton |
| 6,968,242 B1 | 11/2005 | Hwu et al. |
| 6,970,913 B1 | 11/2005 | Albert et al. |
| 6,982,953 B1 | 1/2006 | Swales |
| 7,032,045 B2 | 4/2006 | Kostadinov |
| 7,085,814 B1 | 8/2006 | Gandhi et al. |
| 7,103,428 B2 | 9/2006 | Varone et al. |
| 7,133,900 B1 | 11/2006 | Szeto |
| 7,149,792 B1 | 12/2006 | Hansen et al. |
| 7,151,966 B1 | 12/2006 | Baier et al. |
| 7,203,560 B1 | 4/2007 | Wylie et al. |
| 7,210,095 B1 | 4/2007 | Mor |
| 7,233,830 B1 | 6/2007 | Callaghan et al. |
| 7,242,009 B1 | 7/2007 | Wilson et al. |
| 7,275,037 B2 | 9/2007 | Lauer |
| 7,277,865 B1 | 10/2007 | Silverstone et al. |
| 7,289,994 B2 | 10/2007 | Nixon et al. |
| 7,298,275 B2 | 11/2007 | Brandt et al. |
| 7,310,344 B1 | 12/2007 | Sue |
| 7,383,155 B2 | 6/2008 | Rosam et al. |
| 7,412,548 B2 | 8/2008 | Sichner |
| 7,478,010 B2 | 1/2009 | Hashemian |
| 7,480,728 B2 | 1/2009 | Evans |
| 7,539,724 B1 | 5/2009 | Callaghan |
| 7,734,590 B2 | 6/2010 | Chand et al. |
| 8,150,959 B1 | 4/2012 | Bezdicek et al. |
| 8,266,066 B1 | 9/2012 | Wezter et al. |
| 8,353,012 B2 | 1/2013 | Del Real |
| 8,392,845 B2 | 3/2013 | Cahill et al. |
| 8,451,753 B2 | 5/2013 | Vanga et al. |
| 8,468,272 B2 | 6/2013 | Giroti |
| 8,686,871 B2 | 4/2014 | Jensen et al. |
| 8,924,328 B1 | 12/2014 | Kozlovsky et al. |
| 9,024,955 B2 | 5/2015 | Ramarao et al. |
| 9,117,076 B2 | 8/2015 | Devost |
| 9,507,807 B1 | 11/2016 | Florissi et al. |
| 9,690,669 B2 | 6/2017 | Bemal et al. |
| 2002/0004798 A1 | 1/2002 | Babula et al. |
| 2002/0016839 A1 | 2/2002 | Smith |
| 2002/0042756 A1 | 4/2002 | Kumar et al. |
| 2002/0046239 A1 | 4/2002 | Stawikowski et al. |
| 2002/0049833 A1 | 4/2002 | Kikinis |
| 2002/0065898 A1 | 5/2002 | Leontiev et al. |
| 2002/0068983 A1 | 6/2002 | Sexton |
| 2002/0068984 A1 | 6/2002 | Alexander et al. |
| 2002/0073236 A1 | 6/2002 | Helgeson et al. |
| 2002/0077711 A1 | 6/2002 | Nixon et al. |
| 2002/0082966 A1 | 6/2002 | O'Brien et al. |
| 2002/0094588 A1 | 7/2002 | Fan et al. |
| 2002/0107904 A1 | 8/2002 | Talluri et al. |
| 2002/0138378 A1* | 9/2002 | Leskuski ............... G06Q 20/102 705/34 |
| 2002/0156872 A1 | 10/2002 | Brown |
| 2002/0156926 A1 | 10/2002 | Batke et al. |
| 2002/0161745 A1 | 10/2002 | Call |
| 2002/0169993 A1 | 11/2002 | Woods et al. |
| 2003/0004937 A1 | 1/2003 | Salmenkaita et al. |
| 2003/0009253 A1 | 1/2003 | McIntyre et al. |
| 2003/0009572 A1 | 1/2003 | Thurner |
| 2003/0011467 A1 | 1/2003 | Suomela |
| 2003/0014149 A1 | 1/2003 | Kreidler et al. |
| 2003/0023336 A1 | 1/2003 | Kreidler et al. |
| 2003/0041089 A1 | 2/2003 | Mauro |
| 2003/0051074 A1 | 3/2003 | Edwards |
| 2003/0056224 A1 | 3/2003 | Stone |
| 2003/0105535 A1 | 6/2003 | Rammler |
| 2003/0105585 A1 | 6/2003 | Ukita |
| 2003/0109942 A1 | 6/2003 | Yeh et al. |
| 2003/0120817 A1 | 6/2003 | Ott et al. |
| 2003/0156639 A1 | 8/2003 | Liang |
| 2003/0167238 A1 | 9/2003 | Leif |
| 2003/0167449 A1 | 9/2003 | Warren et al. |
| 2003/0177169 A1 | 9/2003 | Nutt et al. |
| 2003/0177201 A1 | 9/2003 | Shen |
| 2003/0198188 A1 | 10/2003 | Castlebury et al. |
| 2003/0208545 A1 | 11/2003 | Eaton et al. |
| 2003/0217100 A1 | 11/2003 | Kronk |
| 2003/0224769 A1 | 12/2003 | Solve et al. |
| 2003/0236576 A1 | 12/2003 | Resnick et al. |
| 2004/0083165 A1 | 4/2004 | Lawrence |
| 2004/0111512 A1 | 6/2004 | Barth |
| 2004/0148039 A1 | 7/2004 | Farchmin et al. |

(56) References Cited

U.S. PATENT DOCUMENTS

| | | |
|---|---|---|
| 2004/0148187 A1 | 7/2004 | Boettcher et al. |
| 2004/0148383 A1 | 7/2004 | Gonsalves |
| 2004/0159113 A1 | 8/2004 | Singh et al. |
| 2004/0199573 A1 | 10/2004 | Schwartz et al. |
| 2004/0214566 A1 | 10/2004 | Suzuki et al. |
| 2004/0215551 A1 | 10/2004 | Eder |
| 2004/0225629 A1 | 11/2004 | Eder |
| 2004/0267729 A1 | 12/2004 | Swaminathan et al. |
| 2005/0038528 A1 | 2/2005 | McKelvey et al. |
| 2005/0055429 A1 | 3/2005 | Abele et al. |
| 2005/0080799 A1 | 4/2005 | Hamden et al. |
| 2005/0120112 A1 | 6/2005 | Wing et al. |
| 2005/0125441 A1 | 6/2005 | Clemens et al. |
| 2005/0149922 A1 | 7/2005 | Vincent |
| 2005/0203869 A1 | 9/2005 | Minamino et al. |
| 2005/0209902 A1 | 9/2005 | Iwasaki et al. |
| 2005/0257204 A1 | 11/2005 | Bryant et al. |
| 2006/0022048 A1 | 2/2006 | Johnson |
| 2006/0046712 A1 | 3/2006 | Shamp et al. |
| 2006/0077095 A1 | 4/2006 | Tucker et al. |
| 2006/0149813 A1 | 7/2006 | Janik |
| 2006/0153089 A1 | 7/2006 | Silverman |
| 2006/0173873 A1 | 8/2006 | Prompt et al. |
| 2006/0190106 A1 | 8/2006 | Kay et al. |
| 2006/0236374 A1 | 10/2006 | Hartman |
| 2006/0253205 A1 | 11/2006 | Gardiner |
| 2006/0282432 A1 | 12/2006 | Cassidy et al. |
| 2007/0008129 A1 | 1/2007 | Soliman |
| 2007/0019641 A1 | 1/2007 | Pai et al. |
| 2007/0021968 A1 | 1/2007 | Amir et al. |
| 2007/0050206 A1 | 3/2007 | Whikehart et al. |
| 2007/0061018 A1 | 3/2007 | Callaghan et al. |
| 2007/0073850 A1 | 3/2007 | Callaghan et al. |
| 2007/0078525 A1 | 4/2007 | Chand |
| 2007/0078536 A1 | 4/2007 | Gordon et al. |
| 2007/0078862 A1 | 4/2007 | Chand et al. |
| 2007/0112801 A1 | 5/2007 | McGreevy et al. |
| 2007/0118560 A1 | 5/2007 | Bomhoevd et al. |
| 2007/0130112 A1 | 6/2007 | Lin |
| 2007/0192213 A1 | 8/2007 | Wu et al. |
| 2007/0194097 A1 | 8/2007 | Jones |
| 2007/0244892 A1 | 10/2007 | Narancic |
| 2007/0245169 A1 | 10/2007 | Farchmin et al. |
| 2007/0247789 A1 | 10/2007 | Benson et al. |
| 2007/0255431 A1 | 11/2007 | Kinsey |
| 2008/0027704 A1 | 1/2008 | Kephart et al. |
| 2008/0065243 A1 | 3/2008 | Fallman et al. |
| 2008/0077512 A1 | 3/2008 | Grewal |
| 2008/0082186 A1 | 4/2008 | Hood et al. |
| 2008/0125887 A1 | 5/2008 | Case |
| 2008/0155064 A1 | 6/2008 | Kosuge et al. |
| 2008/0189637 A1 | 8/2008 | Krajewski et al. |
| 2008/0208365 A1 | 8/2008 | Grgic et al. |
| 2008/0209211 A1 | 8/2008 | Grgic et al. |
| 2008/0263514 A1 | 10/2008 | DeMesa et al. |
| 2009/0037872 A1 | 2/2009 | Schnabele et al. |
| 2009/0063258 A1 | 3/2009 | Mueller et al. |
| 2009/0083204 A1 | 3/2009 | Baier et al. |
| 2009/0086692 A1 | 4/2009 | Chen |
| 2009/0088875 A1 | 4/2009 | Baier et al. |
| 2009/0089233 A1 | 4/2009 | Gach et al. |
| 2009/0089359 A1 | 4/2009 | Siorek et al. |
| 2009/0089682 A1 | 4/2009 | Baier et al. |
| 2009/0109889 A1 | 4/2009 | Budampati et al. |
| 2009/0125460 A1 | 5/2009 | Hewison et al. |
| 2009/0127325 A1 | 5/2009 | Macurek et al. |
| 2009/0204234 A1 | 8/2009 | Sustaeta et al. |
| 2009/0210071 A1 | 8/2009 | Agrusa et al. |
| 2009/0210814 A1 | 8/2009 | Agrusa et al. |
| 2009/0216341 A1 | 8/2009 | Enkerud et al. |
| 2010/0023562 A1 | 1/2010 | Kreuch et al. |
| 2010/0057660 A1 | 3/2010 | Kato |
| 2010/0076575 A1 | 3/2010 | Vasko et al. |
| 2010/0082127 A1 | 4/2010 | Plache et al. |
| 2010/0082129 A1 | 4/2010 | McGreevy et al. |
| 2010/0082453 A1 | 4/2010 | Speers et al. |
| 2010/0082669 A1 | 4/2010 | Obitko et al. |
| 2010/0083232 A1 | 4/2010 | Chouinard et al. |
| 2010/0118895 A1 | 5/2010 | Radulescu |
| 2010/0146014 A1 | 6/2010 | Ionescu et al. |
| 2010/0153487 A1 | 6/2010 | Greven et al. |
| 2010/0192144 A1 | 7/2010 | Schmit |
| 2010/0211509 A1 | 8/2010 | Jacobs |
| 2010/0241260 A1 | 9/2010 | Kilibarda et al. |
| 2010/0256795 A1 | 10/2010 | McLaughlin et al. |
| 2010/0257227 A1 | 10/2010 | McLaughlin et al. |
| 2010/0257228 A1 | 10/2010 | Staggs et al. |
| 2010/0318837 A1 | 12/2010 | Murphy et al. |
| 2010/0324855 A1 | 12/2010 | Parker |
| 2010/0332008 A1 | 12/2010 | Knipfer et al. |
| 2011/0016058 A1 | 1/2011 | Pinchuk |
| 2011/0047230 A1 | 2/2011 | McGee |
| 2011/0078300 A9 | 3/2011 | Grelewicz et al. |
| 2011/0161378 A1 | 6/2011 | Williamson |
| 2011/0173127 A1 | 7/2011 | Ho et al. |
| 2011/0276498 A1 | 11/2011 | Madhok |
| 2012/0005242 A1 | 1/2012 | Feng et al. |
| 2012/0054246 A1 | 3/2012 | Fischer |
| 2012/0072597 A1 | 3/2012 | Teather et al. |
| 2012/0079461 A1 | 3/2012 | Copass et al. |
| 2012/0083906 A1 | 4/2012 | Weatherhead et al. |
| 2012/0084400 A1 | 4/2012 | Almadi et al. |
| 2012/0089920 A1 | 4/2012 | Eick |
| 2012/0147894 A1 | 6/2012 | Mulligan et al. |
| 2012/0232876 A1 | 9/2012 | Misra |
| 2012/0257544 A1 | 10/2012 | Schein et al. |
| 2012/0262069 A1 | 10/2012 | Reed |
| 2012/0290104 A1 | 11/2012 | Holt et al. |
| 2012/0297249 A1 | 11/2012 | Yang et al. |
| 2012/0304007 A1 | 11/2012 | Hanks et al. |
| 2012/0306620 A1 | 12/2012 | Karaffa et al. |
| 2013/0004281 A1 | 1/2013 | Anders et al. |
| 2013/0012220 A1 | 1/2013 | Waris et al. |
| 2013/0018696 A1 | 1/2013 | Meldrum |
| 2013/0024542 A1 | 1/2013 | Keller et al. |
| 2013/0031158 A1 | 1/2013 | Salsburg |
| 2013/0036198 A1 | 2/2013 | Galm et al. |
| 2013/0041705 A1 | 2/2013 | Hampapur et al. |
| 2013/0097563 A1 | 4/2013 | Pacheco Rodrigues Velho et al. |
| 2013/0097710 A1 | 4/2013 | Basavapatna et al. |
| 2013/0104236 A1 | 4/2013 | Ray et al. |
| 2013/0107772 A1 | 5/2013 | Splitz et al. |
| 2013/0111034 A1 | 5/2013 | Upadhya |
| 2013/0117064 A1 | 5/2013 | Sadeghi et al. |
| 2013/0117806 A1 | 5/2013 | Parthasarathy et al. |
| 2013/0125233 A1 | 5/2013 | Bush et al. |
| 2013/0138812 A1 | 5/2013 | Assuncao et al. |
| 2013/0138818 A1 | 5/2013 | Wolf |
| 2013/0145033 A1 | 6/2013 | Polla et al. |
| 2013/0159500 A1 | 6/2013 | Reus et al. |
| 2013/0182107 A1 | 7/2013 | Anderson |
| 2013/0191106 A1 | 7/2013 | Kephart et al. |
| 2013/0204982 A1 | 8/2013 | Kim et al. |
| 2013/0211546 A1 | 8/2013 | Lawson et al. |
| 2013/0211547 A1 | 8/2013 | Buchdunger et al. |
| 2013/0212420 A1 | 8/2013 | Lawson et al. |
| 2013/0218971 A1 | 8/2013 | Sasaki et al. |
| 2013/0257627 A1 | 10/2013 | Rafael |
| 2013/0283265 A1 | 10/2013 | Acharya et al. |
| 2013/0304237 A1 | 11/2013 | Schroeder et al. |
| 2013/0325545 A1 | 12/2013 | Mordvinova et al. |
| 2014/0013100 A1 | 1/2014 | Menzel et al. |
| 2014/0046977 A1 | 2/2014 | Gopalakrishnan et al. |
| 2014/0047107 A1 | 2/2014 | Maturana et al. |
| 2014/0052499 A1 | 2/2014 | Wagner et al. |
| 2014/0059056 A1 | 2/2014 | Chaney et al. |
| 2014/0095654 A1 | 4/2014 | Finnerty et al. |
| 2014/0137257 A1 | 5/2014 | Martinez et al. |
| 2014/0156032 A1 | 6/2014 | Jenkins et al. |
| 2014/0156584 A1 | 6/2014 | Motukuri et al. |
| 2014/0279641 A1 | 9/2014 | Singh et al. |
| 2014/0279948 A1 | 9/2014 | Mahate et al. |
| 2014/0306533 A1 | 10/2014 | Paquin et al. |
| 2014/0335480 A1 | 11/2014 | Asenjo et al. |

(56) References Cited

U.S. PATENT DOCUMENTS

| | | | |
|---|---|---|---|
| 2014/0336785 | A1 | 11/2014 | Asenjo et al. |
| 2014/0336786 | A1 | 11/2014 | Asenjo et al. |
| 2014/0336791 | A1 | 11/2014 | Asenjo |
| 2014/0336795 | A1 | 11/2014 | Asenjo et al. |
| 2014/0337000 | A1 | 11/2014 | Asenjo et al. |
| 2014/0372347 | A1 | 12/2014 | Cohen et al. |
| 2015/0012763 | A1 | 1/2015 | Cohen et al. |
| 2015/0019191 | A1 | 1/2015 | Maturana et al. |
| 2015/0032886 | A1 | 1/2015 | Wang |
| 2015/0048952 | A1 | 2/2015 | Murphy |
| 2015/0235161 | A1 | 8/2015 | Azar et al. |
| 2015/0304193 | A1 | 10/2015 | Ishii et al. |
| 2015/0378356 | A1 | 12/2015 | Hefeeda et al. |

FOREIGN PATENT DOCUMENTS

| | | |
|---|---|---|
| CN | 101739007 | 6/2010 |
| CN | 102449567 | 5/2012 |
| CN | 102927937 | 2/2013 |
| CN | 103019102 | 4/2013 |
| DE | 19834456 | 2/2000 |
| EP | 1209558 | 5/2002 |
| EP | 1531373 | 5/2005 |
| EP | 1686442 | 8/2006 |
| EP | 1933214 | 6/2008 |
| EP | 2189900 | 5/2010 |
| EP | 2293164 | 3/2011 |
| EP | 2453326 | 5/2012 |
| EP | 2469466 | 6/2012 |
| EP | 2801938 | 11/2014 |
| EP | 2801940 | 11/2014 |
| EP | 2801941 | 11/2014 |
| WO | 0111586 | 2/2001 |
| WO | 0169329 | 9/2001 |
| WO | 0217131 | 2/2002 |
| WO | 03058506 | 7/2003 |
| WO | 2008133715 | 11/2008 |
| WO | 2009046095 | 4/2009 |
| WO | 2011050482 | 5/2011 |
| WO | 2013007866 | 1/2013 |

OTHER PUBLICATIONS

Extended European Search Report for European Patent Application Serial No. 16160604.1, dated Aug. 17, 2016, 9 pages.
Extended European Search Report for EP Patent Application Serial No. 16160611.6, dated Aug. 24, 2016, 10 pages.
Final Office Action for U.S. Appl. No. 14/087,730, dated Aug. 24, 2016, 113 pages.
Extended European Search Report for EP Patent Application Serial No. 16160602.5, dated Sep. 2, 2016, 9 pages.
Non-Final Office Action for U.S. Appl. No. 14/087,835, dated Sep. 23, 2016, 82 pages.
Final Office Action for U.S. Appl. No. 14/087,821, dated Sep. 9, 2016, 97 pages.
Extended European Search Report for EP Patent Application Serial No. 13166670.3, dated Jun. 14, 2016, 10 pages.
"Cloud Computing," Whatis.com, Oct. 27, 2009, http://searchcloudcomputing.techtarget.com/sDefinition/0,,sid201_gci1287881,00.html, 2 pages.
Mell, P., et al., "The NIST Definition of Cloud Computing," Oct. 7, 2009, http://csrc.nist.gov/groups/SNS/cloud/computing/index.html, 2 pages.
European Office Action for EP Patent Application Serial No. 16160611.6, dated Sep. 26, 2016, 2 pages.
European Office Action for EP Patent Application Serial No. 13166670.3, dated Jul. 18, 2016, 2 pages.
Non-Final Office Action for U.S. Appl. No. 14/087,730, dated Feb. 9, 2017, 78 pages.
Chinese Office Action for CN Application Serial No. 201410198289.2, dated Dec. 15, 2016, 21 pages.
Chinese Office Action for CN Application Serial No. 201410195780.X, dated Feb. 3, 2017, 18 pages.
Chinese Office Action for CN Application Serial No. 201410196127.5, dated Nov. 30, 2016, 13 pages.
Office Action for U.S. Appl. No. 14/658,365, dated Mar. 23, 2017, 100 pages.
Chinese Office Action for CN Application Serial No. 201410196150.4, dated Mar. 2, 2017, 37 pages (with English Translation).
Office Action for U.S. Appl. No. 14/087,970, dated Apr. 12, 2017, 59 pages.
Office Action for U.S. Appl. No. 14/658,394, dated Apr. 21, 2017, 97 pages.
Office Action for U.S. Appl. No. 15/388,260, dated Apr. 24, 2017, 101 pages.
Office Action for U.S. Appl. No. 14/658,345, dated Mar. 17, 2017, 95 pages.
Office Action for U.S. Appl. No. 14/658,327, dated May 1, 2017, 99 pages.
Examiner Answer to Appeal Brief for U.S. Appl. No. 14/087,977, dated Feb. 1, 2017.
Givehchi, et al., "Control-as-a-Service from the Cloud: A Case Study for using Virtualized PLCs," 2014 10th IEEE Norkshop on Factory Communication Systems (WFCS 2014), May 5, 2014 IEEE, 4 pages.
Office Action for U.S. Appl. No. 14/088,011, dated May 17, 2017.
Rouse, et al. "Definition Industrial Control System (ICS," whatis.techtarget.com, ed. Mar. 2016 (accessed from <<http://whatis.techtarget.com/definition/industrial-control-system-ICS>> on Jan. 11, 2017).
Office Action for European Patent Application Serial No. 16160604.1-1802, dated May 17, 2017, 6 pages.
Non-Final Office Action for U.S. Appl. No. 14/087,821 dated Mar. 2, 2016, 86 pages.
Non-Final Office Action for U.S. Appl. No. 14/087,977 dated Mar. 17, 2016, 83 pages.
Recursion Software, "SCADA-Aware Mobile", Frisco, TX, Aug. 29, 2012 (accessed from http://www.emsenergyautomation.com/brochures/scada.pdf on Feb. 11, 2016).
Ars Technica, "Windows 7 themes: how to unlock them or create your own", Nov. 12, 2009 (accessed from http://arstechnica.com/information-technology/2009/11/unlock-hidden-windows-7-themesI on Mar. 8, 2016).
Non-Final Office Action for U.S. Appl. No. 14/088,014 dated Mar. 22, 2016, 98 pages.
"Microsoft," "Sharing Outlook 2010 Contact\Notes/Field?", microsoft.com, Jun. 23, 2011 (accessed on Mar. 11, 2016 from http://answers.microsoft.com/en-us/office/forum/office_2010-outlook/sharing-outlook-2010-contactnotes-field/c7e74273-ff60-4da3-a3aa-ccb6cadcd25e?auth= 1).
Notice of Allowance for U.S. Appl. No. 13/608,850 dated Apr. 12, 2016, 37 pages.
Notice of Allowance for U.S. Appl. No. 14/087,873 dated Apr. 18, 2016, 26 pages.
Chinese Office Action for Chinese Application No. 201410196198.5 dated Mar. 29, 2016, 18 pages.
Non-Final Office Action for U.S. Appl. No. 14/088,011 dated May 12, 2016, 96 pages.
Chinese Office Action for Chinese Application No. 201410198289.2 dated Apr. 5, 2016, 18 pages.
Chinese Office Action for Chinese Application No. 201410196905.0 dated Apr. 5, 2016, 20 pages.
Chinese Office Action for Chinese Application No. 201410196127.5 dated Apr. 7, 2016, 13 pages.
Chinese Office Action for Chinese Application No. 201410196775.0 dated May 5, 2016, 14 pages.
Chinese Office Action for Chinese Application No. 201410196525.7 dated May 5, 2016, 13 pages.
Office Action dated Jun. 21, 2016 for U.S. Appl. No. 13/615,195, 27 pages.
Final Office Action dated Jun. 17, 2016 for U.S. Appl. No. 13/725,543, 19 pages.

(56) References Cited

OTHER PUBLICATIONS

Office Action dated Jun. 17, 2016 for U.S. Appl. No. 14/087,970, 36 pages.
Chinese Office Action for Chinese Application No. 201410196114.8 dated Apr. 25, 2016, 20 pages.
Office Action dated Sep. 22, 2015 for European Application No. 14167707.0-1955, 9 pages.
Chinese Office Action dated May 26, 2016 for Chinese Application No. 201410195780.X, 16 pages.
Final Office Action dated Jul. 13, 2016 for U.S. Appl. No. 14/087,977, 59 pages.
Final Office Action dated Jul. 15, 2016 for U.S. Appl. No. 14/088,014, 65 pages.
European Search Report dated Aug. 11, 2014 for European Application No. 14167714.6-1955, 5 pages.
European Search Report dated Aug. 11, 2014 for European Application No. 14167706.2-1955, 7 pages.
European Search Report dated Aug. 11, 2014 for European Application No. 14167626.2-1955, 9 pages.
European Search Report dated Aug. 11, 2014 for European Application No. 14167627.0-1955, 6 pages.
European Search Report dated Aug. 11, 2014 for European Application No. 14167703.9-1955, 7 pages.
European Search Report dated Aug. 11, 2014 for European Application No. 14167707.0-1955, 7 pages.
European Search Report dated Aug. 11, 2014 for European Application No. 14167708.8-1955, 5 pages.
European Search Report dated Aug. 11, 2014 for European Application No. 14167712.0-1955, 5 pages.
European Search Report dated Aug. 11, 2014 for European Application No. 14167511.6-1955, 6 pages.
Office Action dated Dec. 27, 2004 for U.S. Appl. No. 10/162,315, 8 pages.
Office Action dated Jun. 15, 2005 for U.S. Appl. No. 10/162,315, 9 pages.
Office Action dated Sep. 9, 2005 for U.S. Appl. No. 10/162,315, 10 pages.
Vasudevan, A Web Services Primer, Apr. 4 2001, XML.com, http://webservices.xml.com/pub/a/ws/2001/04/04/webservices/index.html.
Office Action dated Mar. 6, 2006 for U.S. Appl. No. 10/162,315, 8 pages.
W3C, Web Services Description Language, http://www.w3.org/TR/wsdl, Mar. 15, 2001, 36 pages.
European Search Report dated Mar. 18, 2004 for European Patent Application Serial No. 03026339, 3 pages.
Compuquest, Inc., SPM-IM-Instant Messaging Client for SpreadMsg Wireless Messaging Software, http://www.compuquestinc.com/spmim.html, Aug. 13, 2002, 4 pages.
Compuquest, Inc., SpreadMsg Lite—Data Capture, Scanning, Extraction & Rule Based Instant Messaging Software, http://web.archive.org/web/20020813080848/ http://www.compuquestinc.com/spmsgl.html, retrieved Jul. 21, 2006, 6 pages.
International Business Machines Corporation, Cross platform instant messaging using web services, Research Disclosure, Kenneth Mason Publications, Hampshire, GB, vol. 458, No. 156, Jun. 2002.
Office Action dated Jun. 18, 2014 for U.S. Appl. No. 13/725,578, 13 pages.
Office Action dated Aug. 19, 2014 for U.S. Appl. No. 13/615,195, 22 pages.
Office Action dated Oct. 9, 2014 for U.S. Appl. No. 13/725,543, 10 pgs.
Office Action dated Dec. 12, 2014 for U.S. Appl. No. 13/725,578, 24 pages.
Office Action dated Jan. 20, 2015 for U.S. Appl. No. 13/615,195, 22 pages.
Third Party Submission under 37 CFR 1.290 dated Nov. 21, 2014 for U.S. Appl. No. 14/087,873, 23 pages.
Office Action for U.S. Appl. No. 13/725,543 dated May 20, 2015, 15 pages.
Office Action for U.S. Appl. No. 13/608,821 dated Jun. 1, 2015, 44 pages.
Office Action for U.S. Appl. No. 13/608,850 dated Jun. 1, 2015, 38 pages.
Office Action for U.S. Appl. No. 13/677,060 dated Apr. 24, 2015, 54 pgs.
Office Action for U.S. Appl. No. 13/725,619 dated Jul. 17, 2015, 45 pages.
Office Action for U.S. Appl. No. 13/725,660 dated Aug. 18, 2015, 90 pgs.
Colombo, A.W., et al., "Factory of the Future: A Service-Oriented System of Modular, Dynamic Reconfigurable and Collaborative Systems," Artificial Intelligence Techniques for Networked Manufacturing Enterprises Management, Springer Series in Advanced Manufacuring 2010, pp. 459-481.
Colombo, Amanda Walter, et al., "Towards the Factory of the Future: A Service-Oriented Cross-layer Infrastructure," ICT Shaping the World: A Scientific View, 2009, pp. 65-81.
Notice of Allowance for U.S. Appl. No. 13/725,578, dated Apr. 24, 2015, 23 pages.
Office Action for U.S. Appl. No. 13/677,060, dated Oct. 20, 2015, 48 pages.
Office Action for U.S. Appl. No. 13/615,195, dated Sep. 21, 2015, 19 pages.
Office Action for U.S. Appl. No. 13/725,660, dated Oct. 26, 2015, 79 pages.
Office Action dated Nov. 25, 2015 for U.S. Appl. No. 14/087,873, 57 pages.
Final Office Action for U.S. Appl. No. 13/725,619 dated Dec. 4, 2015, 21 pages.
Final Office Action for U.S. Appl. No. 13/608,821 dated Dec. 7, 2015, 39 pages.
Final Office Action for U.S. Appl. No. 13/615,195, dated Feb. 11, 2016, 19 pages.
Non-Final Office Action for U.S. Appl. No. 13/725,543, dated Feb. 2, 2016, 15 pages.
Non-Final Office Action for U.S. Appl. No. 13/725,660, dated Jan. 21 2016, 72 pages.
Final Office Action for U.S. Appl. No. 13/608,850, dated Dec. 9, 2015, 25 pages.
Office Action dated Nov. 24, 2015 for European Application No. 14167706.2-1955, 8 pages.
Office Action dated Nov. 24, 2015 for European Application No. 14167626.2-1955, 8 pages.
Notice of Allowance for U.S. Appl. No. 13/725,619 dated Mar. 31, 2016, 26 pages.
Non-Final Office Action for U.S. Appl. No. 13/677,060 dated Mar. 10, 2016, 66 pages.
Notice of Allowance for U.S. Appl. No. 13/725,660 dated Feb. 3, 2016, 47 pages.
Non-Final Office Action for U.S. Appl. No. 14/087,730 dated Mar. 11, 2016, 81 pages.
European Office Action for EP Patent Application Serial No. 16160604.1, dated Sep. 26, 2016, 2 pages.
Office Action for U.S. Appl. No. 13/615,195, dated Oct. 21, 2016, 44 pages.
Office Action for U.S. Appl. No. 14/088,011, dated Nov. 1, 2016, 79 pages.
European Office Action for EP Patent Application Serial No. 16160602.5, dated Oct. 10, 2016, 2 pages.
Office Action for U.S. Appl. No. 14/088,014, dated Nov. 17, 2016, 61 pages.
Chinese Office Action for CN Application U.S. Appl. No. 201410196114.8, dated Nov. 9, 2016, 19 pages.
Chinese Office Action for CN Application Serial No. 201410196905.0, dated Nov. 18, 2016, 6 pages.
Office Action for U.S. Appl. No. 14/087,922, dated Nov. 25, 2016, 65 pages.
European Office Action for EP Patent Application Serial No. 16160610.8, dated Oct. 17, 2016, 2 pages.

(56) References Cited

OTHER PUBLICATIONS

Final Office Action for U.S. Appl. No. 14/658,365 dated Sep. 8, 2017, 59 pages.
Office Action for U.S. Appl. No. 14/087,821 dated Sep. 7, 2017, 63 pages.
Final Office Action for U.S. Appl. No. 14/087,730 dated Aug. 18, 2017, 72 pages.
Final Office Action for U.S. Appl. No. 14/658,345 dated Sep. 25, 2017, 52 pages.
Final Office Action for U.S. Appl. No. 15/388,260 dated Oct. 18, 2017, 76 pages.
Office Action for U.S. Appl. No. 15/206,744 dated Nov. 6, 2017, 48 pages.
Office Action for U.S. Appl. No. 14/658,327 dated Oct. 30, 2017, 48 pages.
Final Office Action for U.S. Appl. No. 14/658,394 dated Nov. 16, 2017, 49 pages.
Office Action for U.S. Appl. No. 15/490,076 dated Dec. 20, 2017, 37 pages.
Office Action for U.S. Appl. No. 15/278,139 dated Jan. 11, 2018, 103 pages.
Final Office Action for U.S. Appl. No. 14/087,821 dated Dec. 14, 2017, 37 pages.
Final Office Action for U.S. Appl. No. 14/088,011 dated Nov. 22, 2017, 77 pages.
Office Action for U.S. Appl. No. 14/087,970 dated Feb. 12, 2018, 69 pages.
Chinese Office Action for CN Application Serial No. 201410196114.8, dated Dec. 13, 2017, 26 pages.

\* cited by examiner

INDUSTRIAL DATA ANALYTICS IN A CLOUD PLATFORM

RELATED APPLICATIONS

This application is a continuation of, and claims priority to, U.S. patent application Ser. No. 14/087,873 filed on Nov. 22, 2013, and entitled, "INDUSTRIAL DATA ANALYTICS IN A CLOUD PLATFORM," which claims the benefit of U.S. Provisional Patent Application Ser. No. 61/821,639, filed on May 9, 2013, and entitled "REMOTE SERVICES AND ASSET MANAGEMENT SYSTEMS AND METHODS." The entireties of these related applications are incorporated herein by reference.

TECHNICAL FIELD

The subject application relates generally to industrial automation, and, more particularly, to techniques for providing industrial data to a cloud platform for analysis by cloud-based applications and services.

BACKGROUND

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures. In general, industrial controllers read input data from sensors and metering devices that provide discreet and telemetric data regarding one or more states of the controlled system, and generate control outputs based on these inputs in accordance with the user-defined program.

In addition to industrial controllers and their associated I/O devices, some industrial automation systems may also include low-level control systems, such as vision systems, barcode marking systems, variable frequency drives, industrial robots, and the like which perform local control of portions of the industrial process, or which have their own localized control systems.

A given industrial enterprise may comprise a large number industrial assets distributed across multiple facilities. These assets may comprise one or more industrial devices operating in conjunction to carry out respective industrial applications (e.g., batch processing, material handling, automated product assembly, quality checks, die casting, etc.). The large number of industrial assets that can make up an industrial enterprise, together with the often continuous operation of those assets, results in generation of a vast amount of potentially useful data across the enterprise. In addition to production statistics, data relating to machine health, alarm statuses, operator feedback (e.g., manually entered reason codes associated with a downtime condition), electrical or mechanical load over time, and the like are often monitored, and in some cases recorded, on a continuous basis. This data is generated by the many industrial devices that can make up a given automation system, including the industrial controller and its associated I/O, telemetry devices for near real-time metering, motion control devices (e.g., drives for controlling the motors that make up a motion system), visualization applications, lot traceability systems (e.g., barcode tracking), etc. Moreover, since many industrial facilities operate on a 24-hour basis, their associated automation systems can generate a vast amount of potentially useful data at high rates. For an enterprise with multiple plant facilities, the amount of generated automation data further increases.

Collective analysis of enterprise-wide data collected from multiple production areas and industrial facilities of an industrial enterprise could yield useful insights into overall plant operations. However, access to the industrial data is typically limited to applications and devices that share a common network with the industrial controllers that collect and generate the data. As such, plant personnel wishing to leverage the industrial data generated by their systems in another application (e.g., a reporting or analysis tool, notification system, visualization application, backup data storage, etc.) are required to maintain such applications on-site using local resources. Moreover, although a given industrial enterprise may comprise multiple plant facilities at geographically diverse locations (or multiple mobile systems having variable locations), the scope of such applications is limited only to data available on controllers residing on the same local network as the application.

Also, given the disparate nature of the industrial devices in use at a given industrial facility, data generated by these devices may conform to several different data types and formats which may not be mutually compatible, rendering collective analysis difficult.

The above-described deficiencies of today's industrial control systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

One or more embodiments of the present disclosure relate to migration of industrial data to a cloud platform for collective analysis and device management. To this end, systems and methods are provided for migrating a customer's industrial data from all stages of manufacturing, as well as throughout the supply chain, to a cloud platform for collective big data analysis. In one or more embodiments, cloud gateway devices can collect data from the customer's industrial assets, associate the data with a customer profile, and push the modified data to the cloud for analysis. The cloud gateways can comprise stand-alone gateway devices, can be integrated into the industrial devices themselves, or can be integrated in network infrastructure devices on the plant network. Analytics services executing on the cloud platform can receive and store the data in a customer data store associated with the customer profile.

To facilitate collective analysis of industrial data from multiple disparate sources (e.g., different customers, devices, supply chain entities, and industries), one or more embodiments can facilitate normalization of some or all of the gathered industrial data so that dependencies and correlations across data sets can be identified. For example, automation devices or cloud gateways can normalize the industrial data according to a common standard and format prior to moving the data to the cloud. In other embodiments, data normalization can be performed on the cloud side by the analytics service after migration of the data to the cloud platform.

Once the industrial data has been moved to the cloud platform, normalized, and associated with a customer profile, analytics applications executing on the cloud platform can leverage the data to provide a number of remote services to the customer. In an example application, cloud-based services can analyze the data using any of a number of techniques (e.g., machine learning, data mining, etc.) to identify dependencies or correlations between aspects of an industrial system that may otherwise be hidden to the customer. Cloud-based analysis can also identify system trends indicative of an impending system failure or operating inefficiency. In another example, device management services can compare the device profile for a given device in service at a customer facility with a product resource data store to determine whether a newer version of the device or associated software is available. Notification services on the cloud platform can deliver upgrade opportunity notifications to specified client devices associated with the industrial enterprise. In another example, data collected from a customer facility can be correlated with data collected from similar industrial applications in use at other customer sites, so that predictions and configuration recommendations can be generated based on learned correlations between asset configurations and system performance.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
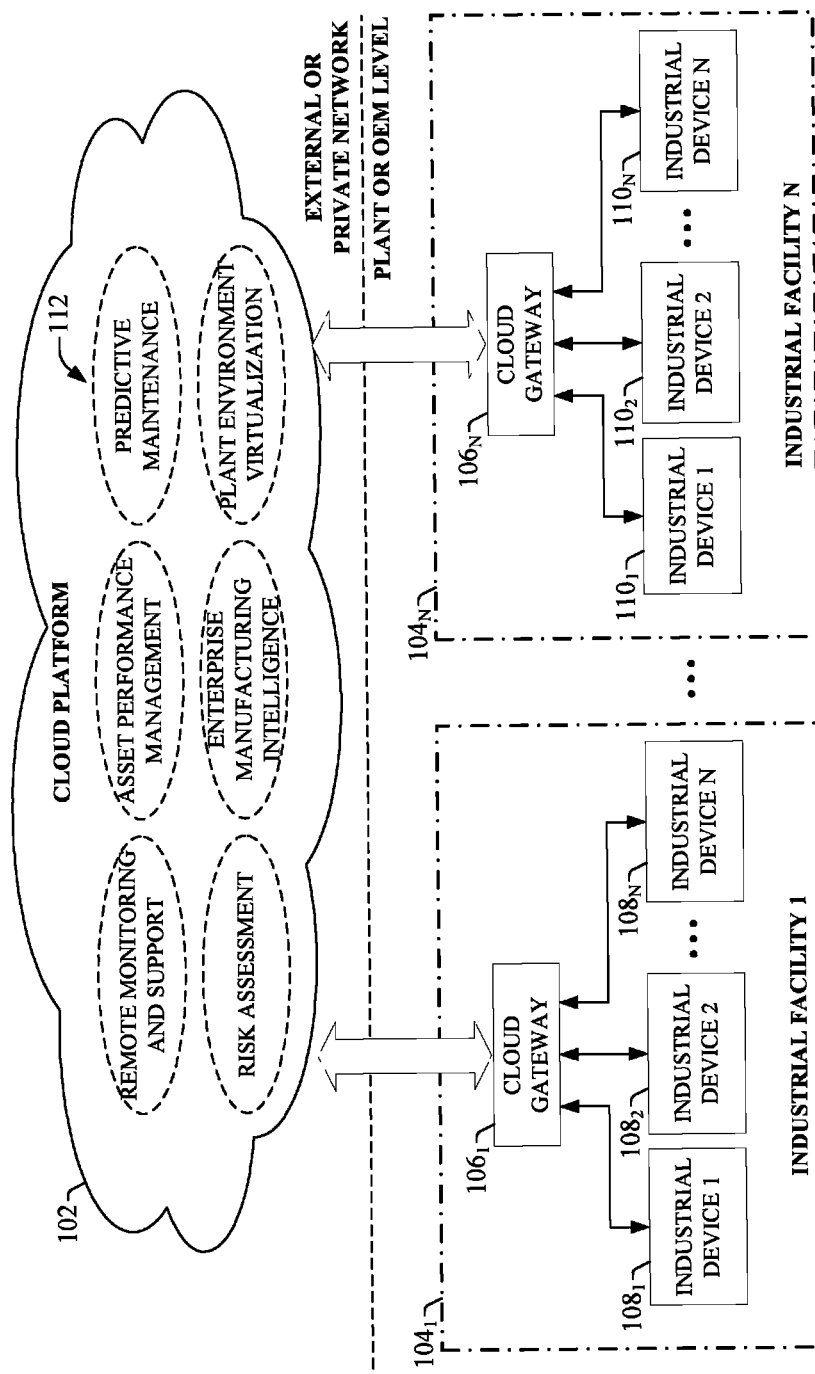
FIG. 1 is a high-level overview of an industrial enterprise that leverages cloud-based services.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

To provide a general context for the cloud-based predictive maintenance system and services described herein, FIG. 1 illustrates a high-level overview of an industrial enterprise that leverages cloud-based services. The enterprise comprises one or more industrial facilities 104, each having a number of industrial devices 108 and 110 in use. The industrial devices 108 and 110 can make up one or more automation systems operating within the respective facilities 104. Exemplary automation systems can include, but are not limited to, batch control systems (e.g., mixing systems), continuous control systems (e.g., PID control systems), or discrete control systems. While some aspects of this disclosure are described with reference to either discrete or process control applications, it is to be understood that the examples described herein are not limited to either discrete or process control industries or operations. Industrial devices 108 and 110 can include such devices as industrial controllers (e.g., programmable logic controllers or other types of programmable automation controllers); field devices such as sensors and meters; motor drives; human-machine interfaces (HMIs); industrial robots, barcode markers and readers; vision system devices (e.g., vision cameras); smart welders; or other such industrial devices.

Exemplary automation systems can include one or more industrial controllers that facilitate monitoring and control of their respective processes. The controllers exchange data with the field devices using native hardwired I/O or via a plant network such as Ethernet/IP, Data Highway Plus, ControlNet, Devicenet, or the like. A given controller typically receives any combination of digital or analog signals from the field devices indicating a current state of the devices and their associated processes (e.g., temperature, position, part presence or absence, fluid level, etc.), and executes a user-defined control program that performs automated decision-making for the controlled processes based on the received signals. The controller then outputs appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code used to process input signals read into the controller and to control output signals generated by the controller, including but not limited to ladder logic, sequential function charts, function block diagrams, structured text, or other such platforms.

Although the exemplary overview illustrated in FIG. 1 depicts the industrial devices 108 and 110 as residing in fixed-location industrial facilities 104, the industrial devices may also be part of a mobile control and/or monitoring application, such as a system contained in a transportation unit (e.g., a truck or other service vehicle) or in a mobile industrial facility. In another example, industrial devices 108 and 110 may comprise devices that perform no control or monitoring of an industrial system, but instead function only to feed data to the cloud-based analysis system (e.g., a mobile weather station).

According to one or more embodiments of this disclosure, industrial devices 108 and 110 can be coupled to a cloud platform 102 to leverage cloud-based applications and services. That is, the industrial devices 108 and 110 can be configured to discover and interact with cloud-based computing services 112 hosted by cloud platform 102. Cloud platform 102 can be any infrastructure that allows shared computing services 112 to be accessed and utilized by cloud-capable devices. Cloud platform 102 can be a public cloud accessible via the Internet by devices having Internet connectivity and appropriate authorizations to utilize the services 112. In some scenarios, cloud platform 102 can be provided by a cloud provider as a platform-as-a-service (PaaS), and the services 112 can reside and execute on the cloud platform 102 as a cloud-based service. In some such configurations, access to the cloud platform 102 and associated services 112 can be provided to customers as a subscription service by an owner of the services 112. Alternatively, cloud platform 102 can be a private cloud operated internally by the enterprise. An exemplary private cloud platform can comprise a set of servers hosting the cloud services 112 and residing on a corporate network protected by a firewall.

Cloud services 112 can include, but are not limited to, data storage, data analysis, control applications (e.g., applications that can generate and deliver control instructions to industrial devices 108 and 110 based on analysis of near real-time system data or other factors), remote monitoring and support, device management, asset performance management, risk assessment services, predictive maintenance services, enterprise manufacturing intelligence services, supply chain performance management, virtualization of the customer's plant environment, notification services, or other such applications. If cloud platform 102 is a web-based cloud, industrial devices 108 and 110 at the respective industrial facilities 104 may interact with cloud services 112 via the Internet. In an exemplary configuration, industrial devices 108 and 110 may access the cloud services 112 through separate cloud gateways 106 at the respective industrial facilities 104, where the industrial devices 108 and 110 connect to the cloud gateways 106 through a physical or wireless local area network or radio link. In another exemplary configuration, the industrial devices 108 and 110 may access the cloud platform directly using an integrated cloud gateway service. Cloud gateways 106 may also comprise an integrated component of a network infrastructure device, such as a firewall box, router, or switch.

Providing industrial devices with cloud capability via cloud gateways 106 can offer a number of advantages particular to industrial automation. For one, cloud-based storage offered by the cloud platform 102 can be easily scaled to accommodate the large quantities of data generated daily by an industrial enterprise. Moreover, multiple industrial facilities at different geographical locations can migrate their respective automation data to the cloud platform 102 for aggregation, collation, collective big data analysis, and enterprise-level reporting without the need to establish a private network between the facilities. Industrial devices 108 and 110 and/or cloud gateways 106 having smart configuration capability can be configured to automatically detect and communicate with the cloud platform 102 upon installation at any facility, simplifying integration with existing cloud-based data storage, analysis, or reporting applications used by the enterprise. In another exemplary application, cloud-based diagnostic applications can access the industrial devices 108 and 110 via cloud gateways 106 to monitor the health and/or performance of respective automation systems or their associated industrial devices across an entire plant, or across multiple industrial facilities that make up an enterprise. In another example, cloud-based lot control applications can be used to track a unit of product through its stages of production and collect production data for each unit as it passes through each stage (e.g., barcode identifier, production statistics for each stage of production, quality test data, abnormal flags, etc.). These industrial cloud-computing applications are only intended to be exemplary, and the systems and methods described herein are not limited to these particular applications. As these examples demonstrate, the cloud platform 102, working with cloud gateways 106, can allow builders of industrial applications to provide scalable solutions as a service, removing the burden of maintenance, upgrading, and backup of the underlying infrastructure and framework.

Figure 2:
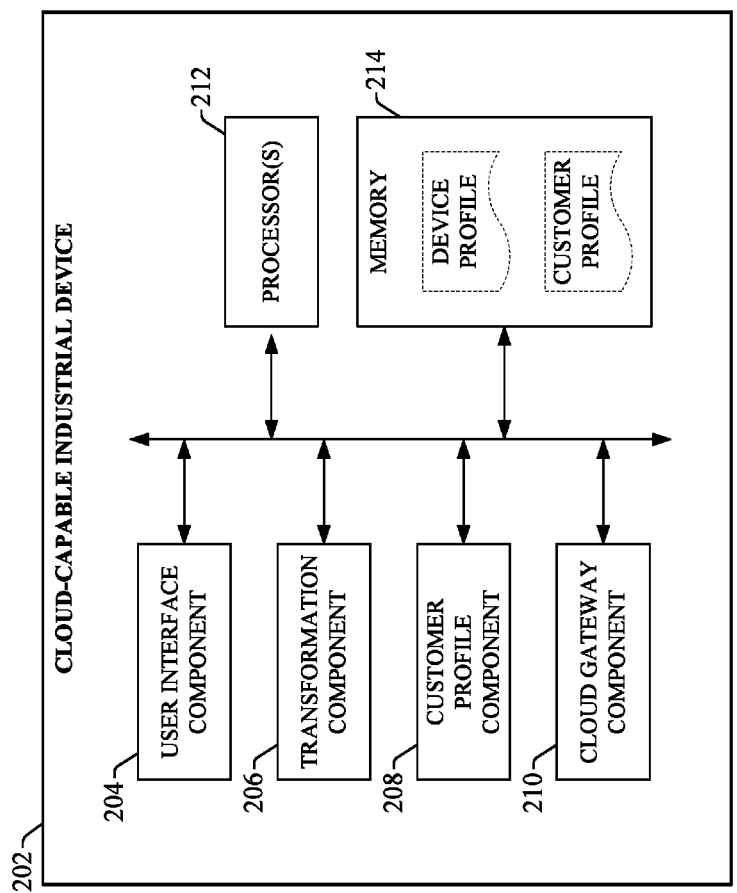
FIG. 2 is a block diagram of an example cloud-capable industrial device.

FIG. 2 is a block diagram of an example cloud-capable industrial device according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Cloud-capable industrial device 202 can include a user interface component 204, a transformation component 206, a customer profile component 208, a cloud gateway component 210, one or more processors 212, and memory 214. In various embodiments, one or more of the user interface component 204, transformation component 206, customer profile component 208, cloud gateway component 210, the one or more processors 212, and memory 214 can be electrically and/or communicatively coupled to one another to perform one or more of the functions of the cloud-capable industrial device 202. In some embodiments, components 204, 206, 208, and 210 can comprise software instructions stored on memory 214 and executed by processor(s) 212. Cloud-capable device 202 may also interact with other hardware and/or software components not depicted in FIG. 2. For example, processor(s) 212 may interact with one or more external user interface devices, such as a keyboard, a mouse, a display monitor, a touchscreen, or other such interface devices.

User interface component 204 can be configured to receive user input and to render output to the user in any suitable format (e.g., visual, audio, tactile, etc.). User input can comprise, for example, configuration information defining whether the cloud-aware industrial device 202 is allowed to push data to and/or pull data from a cloud platform. User input can also comprise address information for a particular cloud platform or a cloud-based application with which the cloud-aware industrial device 202 is to communicate. Transformation component 206 can be configured to transform generated or collected industrial data prior to sending the data to the cloud platform. This can include, for example, normalizing the data in accordance with requirements of a data analytics application on the cloud-platform. Transformation component 206 can also append contextual information to the industrial data prior to migration. Such contextual information may be leveraged by cloud-based analytics applications to identify relationships, correlations, and dependencies across the customer's industrial enterprise (e.g., using machine learning, data mining, or other analytical tools). Other transformations can include data compression, aggregation, filtering, encryption, or other such data transformations. In some embodiments, transformation component 206 can transform the data in accordance with defined a transform profile associated with the cloud-aware industrial device, which can be configured using input received via the user interface component 204.

Customer profile component 208 can be configured to associate items of industrial data with customer profile information maintained in the cloud-aware industrial device 202 prior to migrating the data to the cloud platform. Customer profile data can include, for example, a unique customer identifier, contact information (e.g., email addresses, phone numbers, etc.), or other relevant customer information. Cloud gateway component 210 can be configured to couple the cloud-aware industrial device 202 to a web-based or private cloud. In one or more embodiments, the cloud gateway component 210 can be configured to automatically provide identification and context information relating to its associated industrial device upon connection to the cloud, where at least a portion of the identification and context information is provided by the customer profile component 208 and transformation component 206, respectively. This information may be used by some cloud-based applications to facilitate integrating the industrial device and its associated data with the larger plant-level or enterprise-level system. Cloud gateway component 210 can employ any suitable Internet security protocol to ensure that sensitive data, including information that associates the customer's identity with unique process data, is migrated to the cloud securely.

The one or more processors 212 can perform one or more of the functions described herein with reference to the systems and/or methods disclosed. Memory 214 can be a computer-readable storage medium storing computer-executable instructions and/or information for performing the functions described herein with reference to the systems and/or methods disclosed. In some embodiments, memory can maintain one or more of a device profile and a customer profile. The device profile can comprise information characterizing the cloud-capable industrial device 202 (e.g., model number, device type, current firmware revision, etc.). The customer profile can comprise customer-specific information such as a customer identifier, customer contact information, a type of industry that is the focus of the customer's enterprise, etc.

Figure 3:
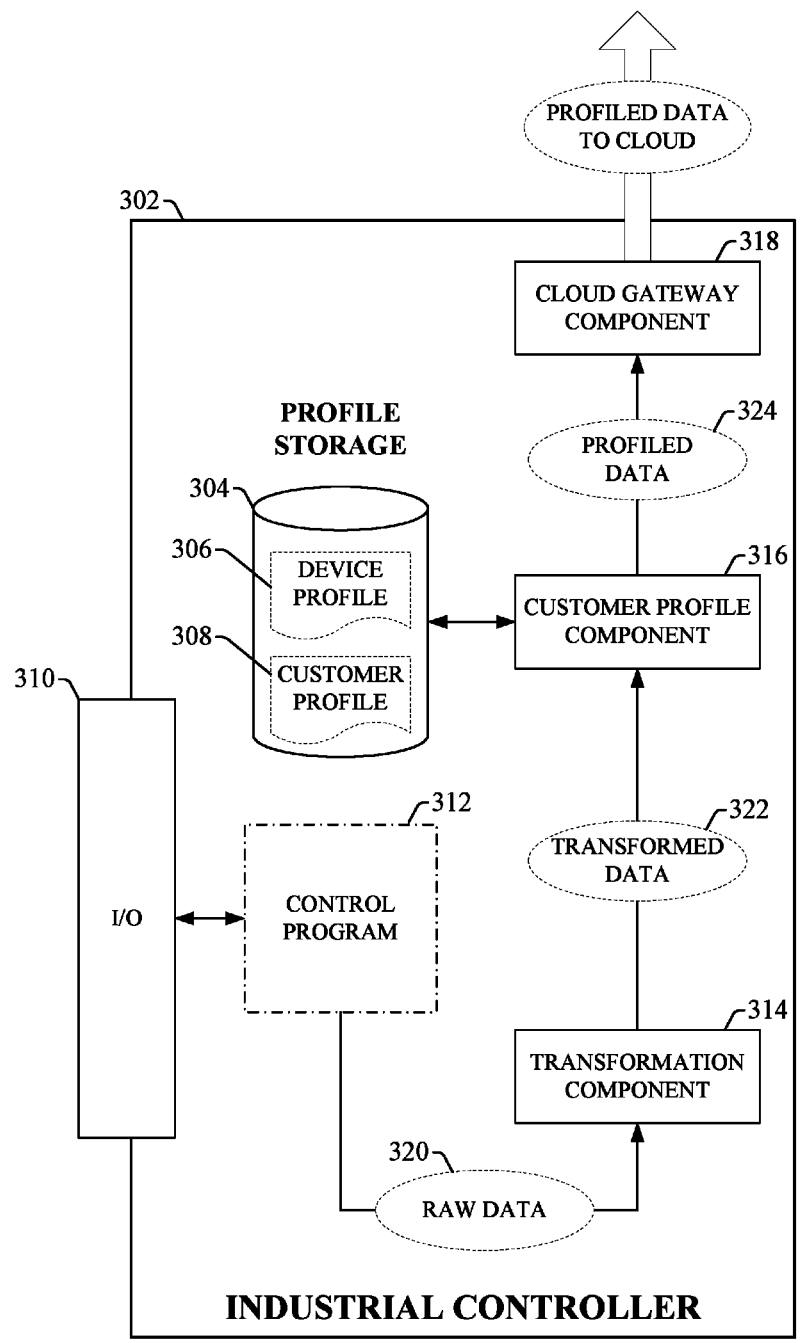
FIG. 3 illustrates an exemplary cloud-capable industrial controller configured to process and migrate industrial data to a cloud-platform.

Data migration techniques described herein can be embodied on substantially any type of industrial device, including but not limited to industrial controllers, variable frequency drives (VFDs), human-machine interface (HMI) terminals, telemetry devices, industrial robots, or other such devices. FIG. 3 illustrates an exemplary cloud-capable industrial controller with the capability to process and migrate industrial data to a cloud-platform. Industrial controller 302 can be, for example, a programmable logic controller (PLC) or other type of programmable automation controllers (PAC) executing control program 312 to facilitate monitoring and control of one or more controlled industrial processes. Control program 312 can be any suitable code used to process input signals read into the controller 302 and to control output signals from the controller 302, including but not limited to ladder logic, sequential function charts, function block diagrams, or structured text. Data read into or generated by controller 302 can be stored in memory addresses within controller memory (e.g., native memory or removable storage media).

Industrial controller 302 can exchange data with the controlled industrial processes through I/O 310, which can comprise one or more local or remote input and/or output modules that communicate with one or more field devices to effect control of the controlled processes. The input and/or output modules can include digital modules that send and receive discrete voltage signals to and from the field devices, or analog modules that transmit and receive analog voltage or current signals to and from the devices. The input and/or output modules can communicate with the controller processor over a backplane or network such that the digital and analog signals are read into and controlled by the control program 312. Industrial controller 302 can also communicate with field devices over a network using, for example, a communication module or an integrated networking port. Exemplary networks over which controller 302 can communicate with field devices can include the Internet, Intranets, Ethernet, Ethernet/IP, DeviceNet, ControlNet, Data Highway and Data Highway Plus (DH/DH+), Remote I/O, Fieldbus, Modbus, Profibus, wireless networks, serial protocols, and the like. It is to be appreciated that industrial controller 302 is not limited to the above specifications, and can be any suitable controller used to control an industrial process.

During operation, industrial controller 302 generates or collects near real-time data relating to the controlled processes, such as part counts, temperatures, motor speeds or loads, vibration data, weights, quality test results, alarms, machine states, operator feedback, or other such information. Some of this data is read by the industrial controller 302 directly from field devices (e.g., telemetry devices) associated with the processes themselves, while some data can be generated by control program 312 based on measured process values. The data collected or generated by industrial controller data—raw data 320—can be stored in non-volatile memory associated with the industrial controller 302, or may only exist on a transient basis (e.g., near real-time machine state data that only exists within the controller 302 as long as the machine remains in the indicated state, but is not stored in non-volatile memory).

Industrial controller 302 is configured to be cloud-aware, allowing it to connect to a web-based or private cloud platform and utilize cloud-based services hosted thereon (e.g., data storage, analysis, processing, etc.). To this end, industrial controller 302 can include a cloud gateway component 318 that couples the industrial controller 302 to the cloud. Cloud gateway component 318 can be configured to access the cloud through any suitable hardwired or wireless connection to the Internet (e.g., through a network connection to an Internet server, or through cloud gateway 106 of FIG. 1). In one or more embodiments, cloud gateway component 318 can execute an auto-configuration routine that facilitates connection of industrial controller 302 to the cloud. In accordance with this auto-configuration routine, the cloud gateway component 318 can provide information to the cloud services about the industrial controller 302, the owner of the industrial controller, and optionally, a context of the industrial controller 302 within the overall enterprise or plant hierarchy.

In order to place the raw industrial data in a format suitable for storage and analysis on the cloud platform, cloud-aware industrial controller 302 can include a transformation component 314 configured to modify or enhance raw data 320 generated or collected by the industrial controller 302 into transformed data 322 prior to sending the data to the cloud. In accordance with determined requirements of the cloud applications that will be processing the industrial data (e.g., predictive maintenance applications, risk assessment applications, cloud-based simulation applications, etc.), transformation component 314 can filter, prune, re-format, aggregate, summarize, or compress the raw data 320 to yield transformed data 322. In one or more embodiments, the transformation component 314 can modify the raw data 320 based on an explicit or inferred requirement of the cloud application, user-defined transform profiles instructing how various categories of raw data are to be transformed prior to being pushed to the cloud, and/or contextual metadata that provides context for the raw data.

Figure 4:
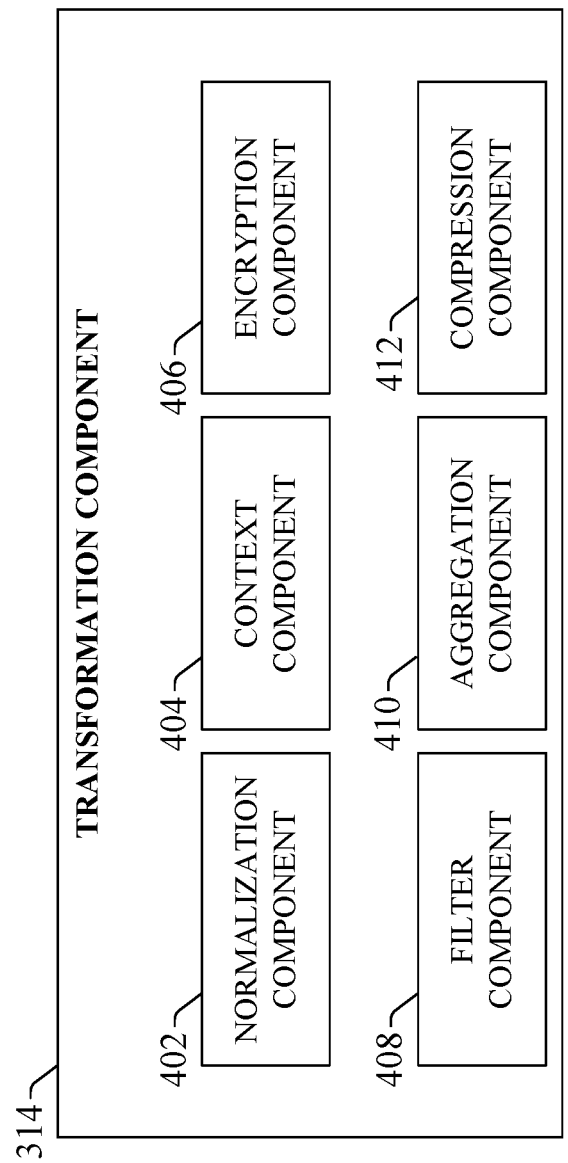
FIG. 4 is a block diagram of an exemplary transformation component.

Turning briefly to FIG. 4, a block diagram of an exemplary transformation component 314 is illustrated. As discussed above, transformation component 314 can be incorporated in an industrial device, such as an industrial controller, meter, sensor, motor drive, robot, or other such industrial devices. Transformation component 314 can receive raw data 320 generated or collected by the host industrial device, and modify the raw data 320 into transformed data 322 that is better suited to cloud computing applications.

To this end, transformation component 314 can include one or more of a normalization component 402, a context component 404, an encryption component 406, a filter component 408, an aggregation component 410, or a compression component 412. Normalization component 402 can be configured to convert any specified subset of raw data 320 from a first format to a second format in accordance with a requirement of the cloud-based application, thereby normalizing the data for collective analysis with data from other disparate data sources. For example, a cloud-based predictive maintenance application may require measured values in a particular common format so that dependencies and correlations between different data sets from disparate industrial assets can be identified and analyzed. Accordingly, normalization component 402 can convert a selected subset of the raw data 320 from a native format to the required common format prior to pushing the data to the cloud-based predictive maintenance application. Normalizing the raw data at the industrial device before uploading to the cloud, rather than requiring this transformation to be performed on the cloud, can reduce the amount of processing load on the cloud side. However, in some embodiments, the data may be normalized by the cloud-based application itself, rather than by the normalization component 402 on the industrial device. Such embodiments may reduce the processing load on the industrial devices themselves, which may be preferable for highly critical control applications.

Figure 5:
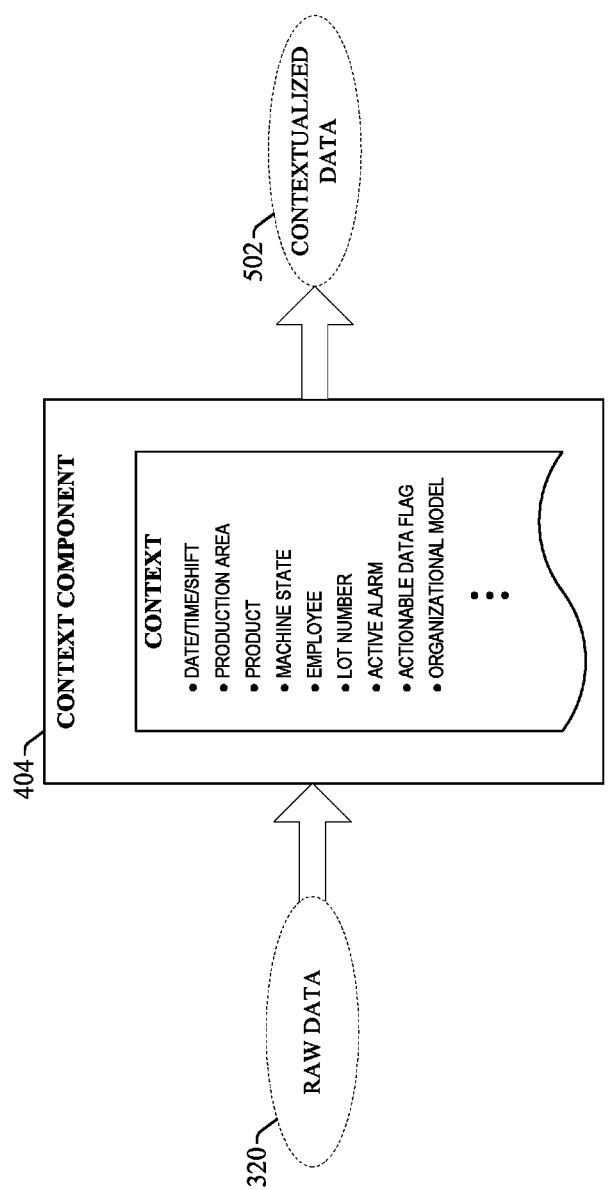
FIG. 5 illustrates an example context component for transforming raw data into contextualized data.

Context component 404 can append contextual metadata to the raw data, thereby providing the cloud-based services with useful context information for the industrial data. Context metadata can include, but is not limited to, a time/date stamp, a quality value, a location associated with the data (e.g., a geographical location, a production area, etc.), machine statuses at the time the data was generated, or other such contextual information, which can be used by the cloud-based application in connection with cloud-side analysis. Turning briefly to FIG. 5, an exemplary context component for transforming raw data into contextualized data is illustrated. Context component 404 receives raw data 320 and modifies or enhances the raw data with one or more pieces of context data to yield contextualized data 502. For example, context component 404 can apply a time stamp to the raw data 320 indicating a time, a date, and/or a production shift when the data was generated. The applied context data may also include a production area that yielded the data, a particular product that was being produced when the data was generated, a state of a machine (e.g., auto, semi-auto, abnormal, etc.) at the time the data was generated, and/or a role of the device within the context of the industrial process. Other examples of context information include an employee on shift at the time the data was generated, a lot number with which the data is associated, or an alarm that was active at the time the data was generated. Context component 404 can also apply an actionable data tag to the raw data if it is determined that the data requires action to be taken by plant personnel or by the cloud-based application. In yet another example, context information can include data describing behavior of a monitored device or machine relative to other related machines, such as timings of staggered start sequences or load shedding sequences. In an example scenario, such data could be used by the cloud-based services to predict or diagnose behavior of a given device or machine based on behavior or conditions of other devices on the same production line.

Context component 404 an also apply contextual information to the raw data 320 that reflects the data's location within a hierarchical organizational model. Such an organization model can represent an industrial enterprise in terms of multiple hierarchical levels. In an exemplary organizational model, the hierarchical levels can include—from lowest to highest—a workcell level, a line level, an area level, a site level, and an enterprise level. Devices that are components of a given automation system can be described and identified in terms of these hierarchical levels, allowing a common terminology to be used across the entire enterprise to identify devices, machines, and data within the enterprise. In some embodiments, the organizational model can be known to the context component 404, which can stamp the raw data 320 with a hierarchical identification tag that indicates the data's origin within the organizational hierarchy (e.g., Company:Marysville:DieCastArea:#1Headline:LeakTestCell).

Returning now to FIG. 4, transformation component 314 may also include an encryption component 406 configured to encrypt sensitive data prior to upload to the cloud. Transformation component 314 can also include a filter component 420 configured to filter the raw data 320 according to any specified filtering criterion (e.g., as defined in a transform profile associated with the cloud-aware industrial controller 302). For example, a transform profile may specify that pressure values below a defined setpoint are to be filtered out prior to uploading the pressure values to the cloud. Accordingly, filter component 420 can implement this requirement by removing pressure valves that fall below the setpoint prior to moving the data to the cloud.

Aggregation component 410 can be configured to combine related data from multiple sources. For example, data from multiple sensors measuring related aspects of an automation system can be identified and aggregated into a single cloud upload packet by aggregation component 410. Compression component 412 can compress data to be uploaded to the cloud using any suitable data compression algorithm. This can include detection and deletion of redundant data bits, truncation of precision bits, or other suitable compression operations.

Transformation component 314 is not limited to the transformation operations described above in connection with components 402-412, and any suitable data transformation is within the scope of certain embodiments of this disclosure.

Returning now to FIG. 3, the transformed data 322 can be further modified by appending data from one or both of a device profile 306 or a customer profile 308 stored in profile storage 304 of the industrial device. Device profile 306 contains information that characterizes industrial controller 302, including but not limited to a device identifier (e.g., a model number, serial number, vendor identifier, etc.) and a current configuration of the device (e.g., current firmware version loaded on the device, current operating system, etc.). Customer profile 308 contains information identifying the customer (e.g., owner of industrial controller 302 and associated industrial assets) and relevant customer-specific information such as personnel contact information, the customer's industry, etc. As will be discussed in more detail below, the customer-specific and device-specific information contained in customer profile 308 and device profile 306 can be used by cloud-based services in a number of ways, including but not limited to device management and version control, alarm notification, etc.

Profiled data 324, comprising the transformed data 322 appended with information from device profile 306 and/or customer profile 308, is then sent to the cloud platform by cloud gateway component 318. Services residing on the cloud platform can process the profiled data according to defined functionality of the cloud-based services. For example, data collection services on the cloud-platform can store the received industrial data in customer-specific cloud storage based on the customer profile data. In another example, cloud-based device management services can compare the current device information provided by device profile 306 with product information maintained on cloud storage to determine whether upgrades or software updates are available for the industrial controller 302. In yet another example, cloud-based analytics services can analyze the received data collectively with data received from other devices, assets, and industrial enterprises in order to learn industry specific trends, provide predictive maintenance notifications, generate risk assessment reports, identify system configurations or best practices that result in superior performance, or other services.

Although FIG. 3 illustrates certain aspects of the present disclosure in connection with an industrial controller, it is to be appreciated that the transformation component 314, customer profile component 316, profile storage 304, and cloud gateway component 318 can be implemented on any suitable industrial device that generates or collects data in connection with monitoring or controlling an industrial process. For example, a variable frequency drive (VFD) used in a motor control application can be provided with cloud interface capabilities so that motion control data (e.g., motor speeds, electrical draw, motor positions, overload conditions, etc.) can be pushed to the cloud for storage or analysis. Accordingly, such VFDs can include a transformation component that massages and/or contextualizes the data prior to uploading the data to the cloud. Similarly, telemetry devices (e.g., flow meters, weigh scales, voltage meters, pressure meters, sensors, etc.) can be configured to refine their respective metered data for upload to the cloud. Moreover, in some embodiments, an industrial device can be configured to serve as a proxy for other industrial devices, wherein the proxy device receives industrial data from other devices comprising an automation system, transforms the collected data as needed, and uploads the results to the cloud. In this way, redundant data collected by multiple devices can be identified and streamlined by the proxy device prior to pushing the data to the cloud, reducing bandwidth and storage consumption.

As noted above, industrial data can be migrated from industrial devices to the cloud platform using cloud gateways. To this end, some devices may include integrated cloud gateways that directly interface each device to the cloud platform. Alternatively, some configurations may utilize a cloud proxy device that collects industrial data from multiple devices and sends the data to the cloud platform. Such a cloud proxy can comprise a dedicated data collection device, such as a proxy server that shares a network with the industrial devices. Alternatively, the cloud proxy can be a peer industrial device that collects data from other industrial devices.

Figure 6:
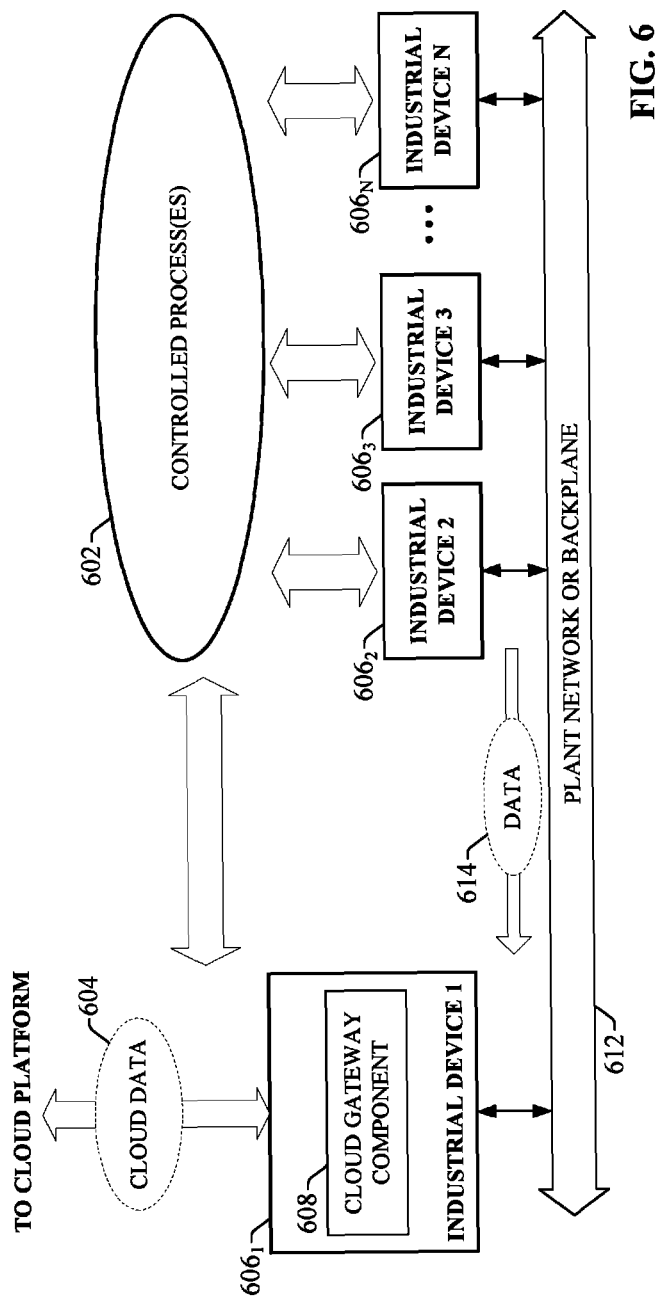
FIG. 6 illustrates a configuration in which an industrial device acts as a cloud proxy for other industrial devices comprising an industrial system.
Figure 7:
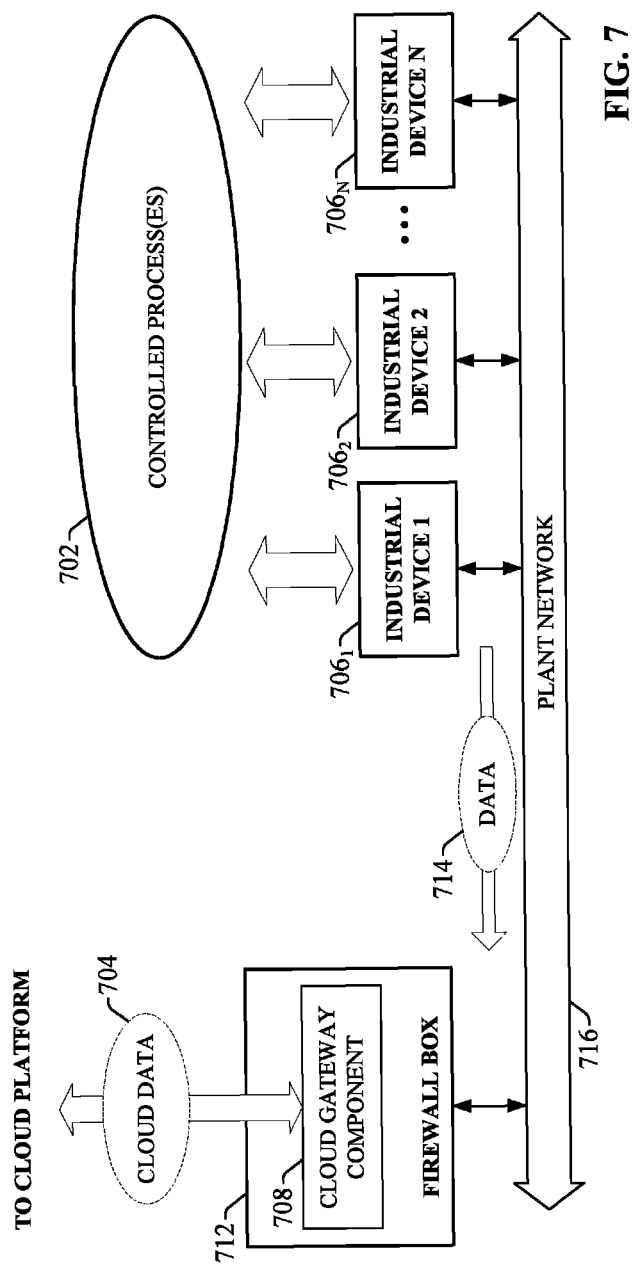
FIG. 7 illustrates a configuration in which a firewall box serves as a cloud proxy for a set of industrial devices.

FIGS. 6 and 7 depict example techniques for migrating industrial data to the cloud platform via proxy devices to facilitate feeding the data to a cloud-based big data analyzer. FIG. 6 depicts a configuration in which an industrial device acts as a cloud proxy for other industrial devices comprising an industrial system. The industrial system comprises a plurality of industrial devices $606_1$-$606_N$ which collectively monitor and/or control one or more controlled processes 602. The industrial devices $606_1$-$606_N$ respectively generate and/or collect process data relating to control of the controlled process(es) 602. For industrial controllers such as PLCs or other automation controllers, this can include collecting data from telemetry devices connected to the controller's I/O, generating data internally based on measured process values, etc.

In the configuration depicted in FIG. 6, industrial device $606_1$ acts as a proxy for industrial devices $606_2$-$606_N$, whereby data 614 from devices $606_2$-$606_N$ is sent to the cloud via proxy industrial device $606_1$. Industrial devices $606_2$-$606_N$ can deliver their data 614 to proxy industrial device $606_1$ over plant network or backplane 612 (e.g., a Common Industrial Protocol (CIP) network or other suitable network protocol). Using such a configuration, it is only necessary to interface one industrial device to the cloud platform (via cloud gateway component 608). In some embodiments, cloud gateway component 608 or a separate transformation component (e.g., transformation component 314) may perform preprocessing on the gathered data prior to migrating the data to the cloud platform (e.g., time stamping, filtering, formatting, summarizing, compressing, etc.). The collected and processed data can then be pushed to the cloud platform as cloud data 604 via cloud gateway component 608. Once migrated, cloud-based data analyzer services can classify the data according to techniques described in more detail below.

While the proxy device illustrated in FIG. 6 is depicted as an industrial device that itself performs monitoring and/or control of a portion of controlled process(es) 602, other types of devices can also be configured to serve as a cloud proxies for multiple industrial devices according to one or more embodiments of this disclosure. For example, FIG. 7 illustrates an embodiment in which a firewall box 712 serves as a cloud proxy for a set of industrial devices $706_1$-$706_N$. Firewall box 712 can act as a network infrastructure device that allows plant network 716 to access an outside network such as the Internet, while also providing firewall protection that prevents unauthorized access to the plant network 716 from the Internet. In addition to these firewall functions, the firewall box 712 can include a cloud gateway component 708 that interfaces the firewall box 712 with one or more cloud-based services. In a similar manner to proxy industrial device $606_1$ of FIG. 6, the firewall box 712 can collect industrial data 714 from industrial devices $706_1$-$706_N$, which monitor and control respective portions of controlled process(es) 702. Firewall box 712 can include a cloud gateway component 708 that applies appropriate pre-processing to the gathered industrial data 714 prior to pushing the data to cloud-based analytics systems as cloud data 704. Firewall box 712 can allow industrial devices 706₁-706_N to interact with the cloud platform without directly exposing the industrial devices to the Internet.

Similar to industrial controller 302 described above in connection with FIG. 3, industrial device 606₁ or firewall box 712 can tag the collected industrial data with contextual metadata prior to pushing the data to the cloud platform (e.g., using a transformation component 314). Such contextual metadata can include, for example, a time stamp, a location of the device at the time the data was generated, or other such information. In another example, some cloud-aware devices can comprise smart devices capable of determining their own context within the plant or enterprise environment. Such devices can determine their location within a hierarchical plant context or device topology. Knowledge of the location of a given device or machine within the context of the larger plant hierarchy can yield useful insights that can be leveraged for predictive analysis. For example, an operational demand on a given machine on a production line can be anticipated based on an observed increase in demand on other machines on the same line, based on the known relationship between the respective machines. Data generated by such devices can be normalized to adhere to a hierarchical plant model that defines multiple hierarchical levels of an industrial enterprise (e.g., a workcell level, a line level, an area level, a site level, an enterprise level, etc.), such that the data is identified in terms of these hierarchical levels. This can allow a common terminology to be used across an entire industrial enterprise to identify devices and their associated data. Cloud-based applications and services that model an enterprise according to such an organizational hierarchy can represent industrial controllers, devices, machines, or processes as data structures (e.g., type instances) within this organizational hierarchy to provide context for data generated by devices within the enterprise relative to the enterprise as a whole. Such a convention can replace the flat name structure employed by some industrial applications.

In some embodiments, cloud gateway components 608 and 708 can comprise uni-directional "data only" gateways that are configured only to move data from the premises to the cloud platform. Alternatively, cloud gateway components 608 and 708 can comprise bi-directional "data and configuration" gateways that are additionally configured to receive configuration or instruction data from services running on the cloud platform. Some cloud gateways may utilize store-and-forward technology that allows the gathered industrial data to be temporarily stored locally on storage associated with the cloud gateway in the event that communication between the gateway and cloud platform is disrupted. In such events, the cloud gateways will forward the stored data to the cloud platform when the communication link is re-established.

Figure 8:
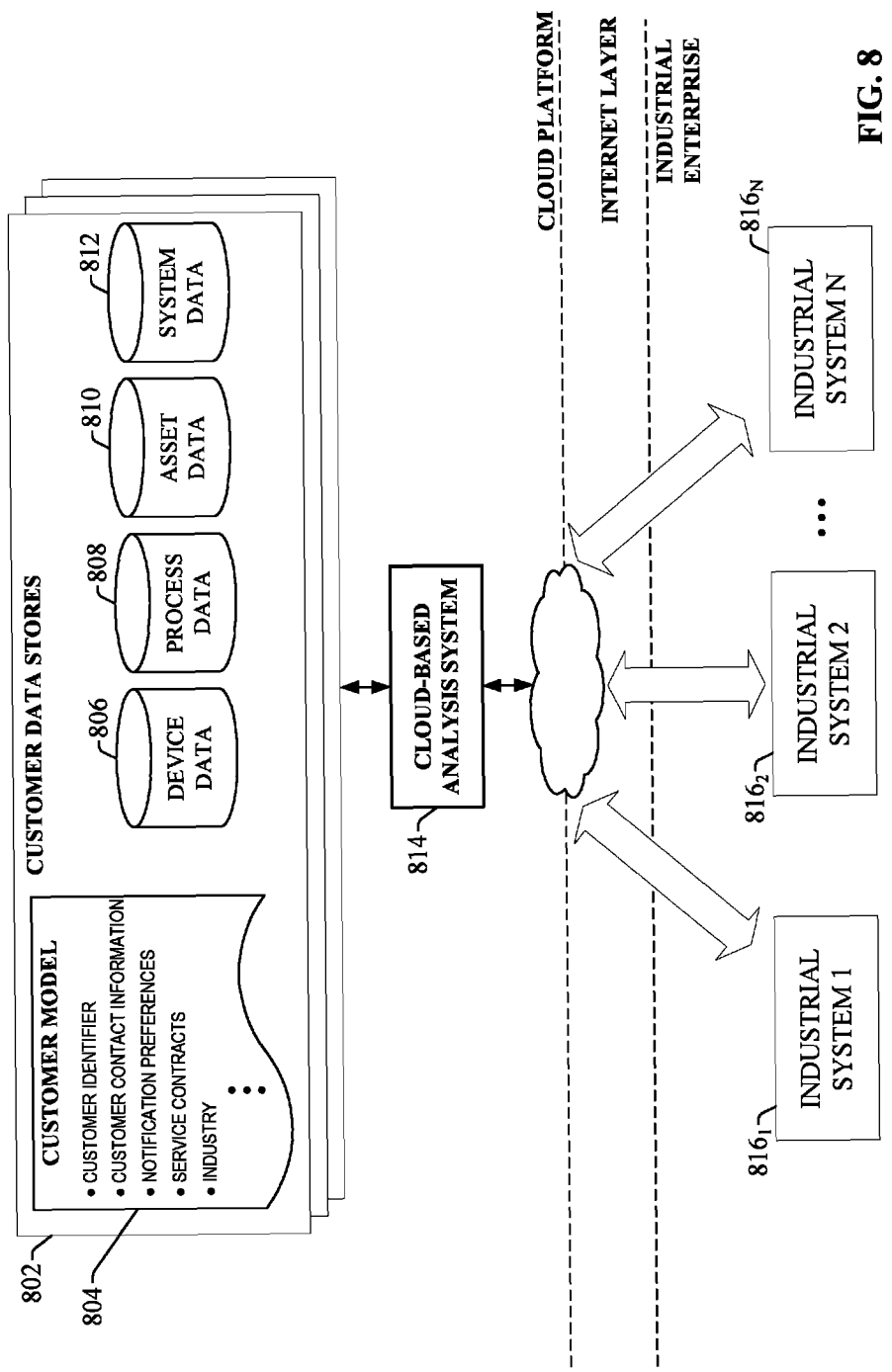
FIG. 8 illustrates collection of customer-specific industrial data in a cloud platform for cloud-based analysis.

FIG. 8 illustrates collection of customer-specific industrial data by a cloud-based analysis system 814 according to one or more embodiments. As discussed above, analysis system 814 can execute as a cloud-based service on a cloud platform (e.g., cloud platform 102 of FIG. 1), and collect data from multiple industrial systems 816. Industrial systems 816 can comprise different industrial automation systems within a given facility and/or different industrial facilities at diverse geographical locations. Industrial systems 816 can also correspond to different business entities (e.g., different industrial enterprises or customers), such analysis system 814 collects and maintains a distinct customer data store 802 for each customer or business entity.

Figure 9:
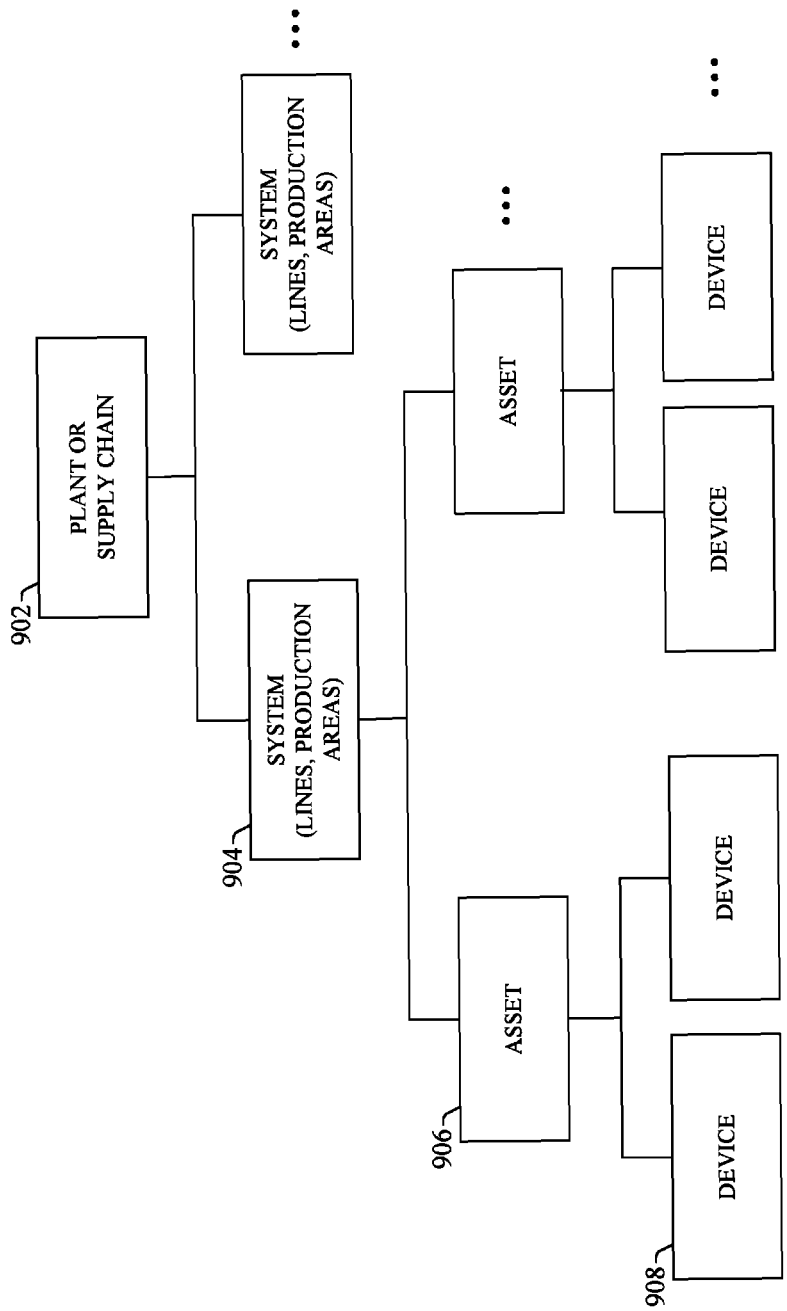
FIG. 9 illustrates a hierarchical relationship between these example data classes.

Analysis system 814 can organize manufacturing data collected from industrial systems 816 according to various classes. In the illustrated example, manufacturing data is classified according to device data 806, process data 808, asset data 810, and system data 812. FIG. 9 illustrates a hierarchical relationship between these example data classes. A given plant or supply chain 902 can comprise one or more industrial systems 904. Systems 904 represent the production lines or productions areas within a given plant facility or across multiple facilities of a supply chain. Each system 904 is made up of a number of assets 906 representing the machines and equipment that make up the system (e.g., the various stages of a production line). In general, each asset 906 is made up of multiple devices 908, which can include, for example, the programmable controllers, motor drives, human-machine interfaces (HMIs), sensors, meters, etc. comprising the asset 906. The various data classes depicted in FIGS. 8 and 9 are only intended to be exemplary, and it is to be appreciated that any organization of industrial data classes maintained by analysis system 814 is within the scope of one or more embodiments of this disclosure.

Returning now to FIG. 8, analysis system 814 collects and maintains data from the various devices and assets that make up industrial systems 816 and classifies the data according to the aforementioned classes for the purposes of collective analysis. Device data 806 can comprise device-level information relating to the identity, configuration, and status of the respective devices comprising industrial systems 816, including but not limited to device identifiers, device statuses, current firmware versions, health and diagnostic data, device documentation, identification and relationship of neighboring devices that interact with the device, etc.

Process data 808 can comprise information relating to one or more processes or other automation operations carried out by the devices; e.g., device-level and process-level faults and alarms, process variable values (speeds, temperatures, pressures, etc.), and the like.

Asset data 810 can comprise information generated collected or inferred based on data aggregated from multiple industrial devices over time, which can yield a higher asset-level views of industrial systems 816. Example asset data 810 can include performance indicators (KPIs) for the respective assets, asset-level process variables, faults, alarms, etc. Since asset data 810 yields a longer term view of asset characteristics relative to the device and process data, analysis system 814 can leverage asset data 810 to identify operational patterns and correlations unique to each asset, among other types of analysis. The system can use such patterns and correlations, for example, to identify common performance trends as a function of asset configuration for different types of industrial applications.

System data 812 can comprise collected or inferred information generated based on data aggregated from multiple assets over time. System data 812 can characterize system behavior within a large system of assets, yielding a system-level view of each industrial system 816. System data 812 can also document the particular system configurations in use and industrial operations performed at each industrial system 816. For example, system data 812 can document the arrangement of assets, interconnections between devices, the product being manufactured at a given facility, an industrial process performed by the assets, a category of industry of each industrial system (e.g., automotive, oil and gas, food and drug, marine, textiles, etc.), or other relevant information. Among other functions, this data can be leveraged by analysis system 814 so that particulars of the customer's unique system and device configurations can be obtained without reliance on the customer to possess complete knowledge of their assets.

As an example, a given industrial facility can include packaging line (the system), which in turn can comprise a number of individual assets (a filler, a labeler, a capper, a palletizer, etc.). Each asset comprises a number of devices (controllers, variable frequency drives, HMIs, etc.). Using an architecture similar to that depicted in FIG. 1, cloud-based analysis system 814 can collect industrial data from the individual devices during operation and classify the data in a customer data store 802 according to the aforementioned classifications. Note that some data may be duplicated across more than one class. For example, a process variable classified under process data 808 may also be relevant to the asset-level view of the system represented by asset data 810. Accordingly, such process variables may be classified under both classes. Moreover, subsets of data in one classification may be derived or inferred based on data under another classification. Subsets of system data 812 that characterize certain system behaviors, for example, may be inferred based on a long-term analysis of data in the lower-level classifications.

In addition to maintaining data classes 806-812, each customer data store can also maintain a customer model 804 containing data specific to a given industrial entity or customer. Customer model 804 contains customer-specific information and preferences (at least some of which may be received from one or more industrial devices using customer profile 308), which can be leveraged by analysis system 814 to better customize data analysis and to determine how analysis results should be handled or reported. Example information maintained in customer model 804 can include a client identifier, client contact information specifying which plant personnel should be notified in response to detection of risk factors (e.g., for embodiments that support real-time risk assessment monitoring), notification preferences specifying how plant personnel should be notified (e.g., email, mobile phone, text message, etc.), preferred data upload frequencies, service contracts that are active between the customer and a provider of the cloud-based analysis services, the customer's industrial concern (e.g., automotive, pharmaceutical, oil and gas, etc.), and other such information. Cloud-based analysis system 814 can marry data collected for each customer with the customer model for identification and event handling purposes. In some embodiments, the cloud-based system can serve a custom interface to client devices of authorized plant personnel to facilitate entering or editing the customer model 804. In other embodiments, all or portions of the customer model 804 can be updated in near real-time based on data maintained on a local server on the plant facility. For example, if an engineering manager is replaced, an administrator at the plant facility may update a locally maintained employee database with the name and contact information for the new manager. The employee database may be communicatively linked to the cloud platform, such that the contact information stored in the customer model 804 is automatically updated to replace the contact information of the outgoing manager with the new employee contact information.

Figure 10:
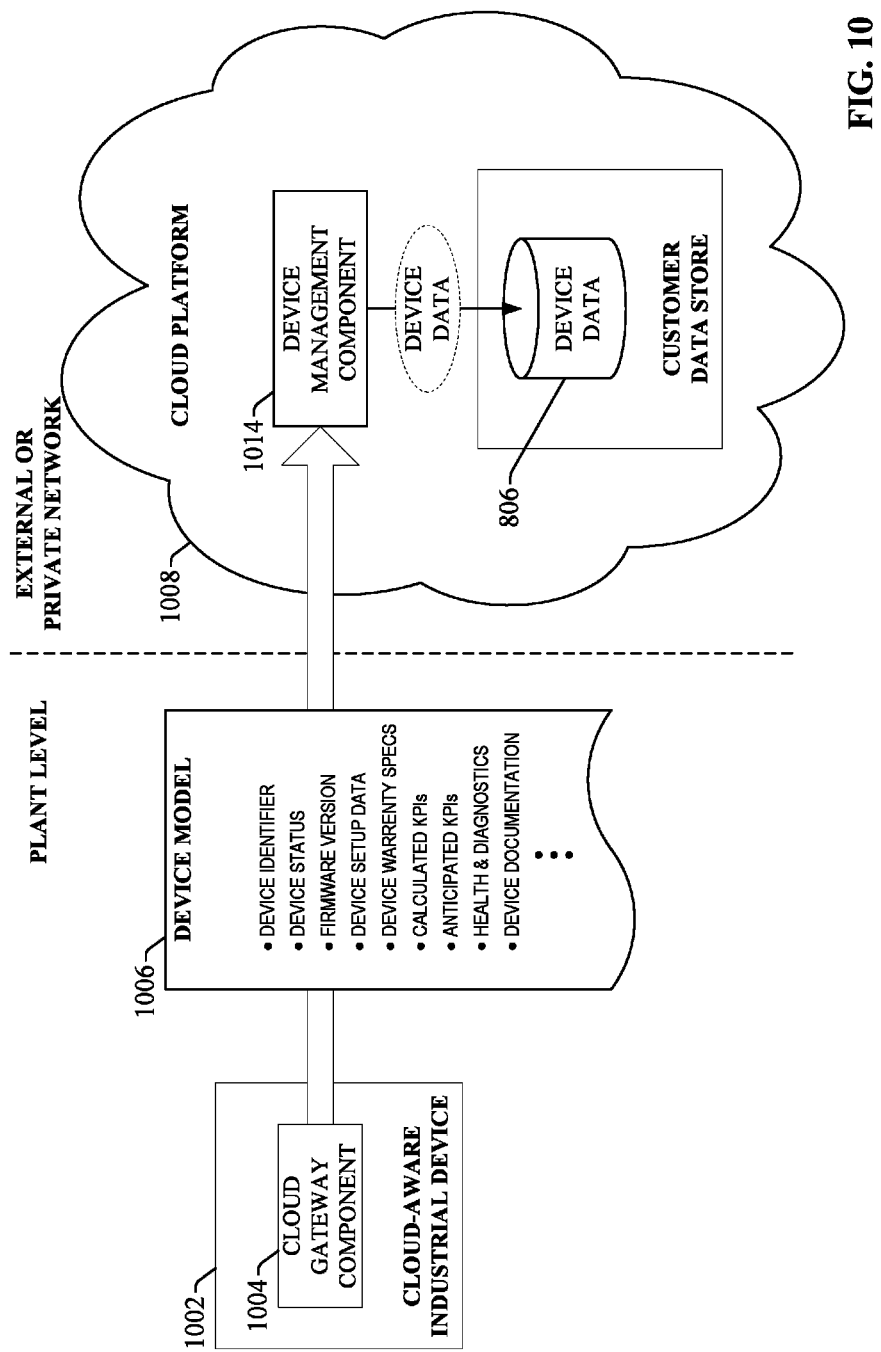
FIG. 10 illustrates delivery of an example device model to a cloud platform.

To ensure a rich and descriptive set of data for analysis purposes, cloud-based analysis services can collect device data in accordance with one or more standardized device models. To this end, a standardized device model can be developed for each industrial device. Device models profile the device data that is available to be collected and maintained by the cloud-based services. FIG. 10 illustrates an example device model according to one or more embodiments. In the illustrated example, device model 1006 is associated with a cloud-aware industrial device 1002 (e.g., a programmable logic controller, a variable frequency drive, a human-machine interface, a vision camera, a barcode marking system, etc.). As a cloud-aware device, industrial device 1002 can be configured to automatically detect and communicate with cloud platform 1008 upon installation at a plant facility, simplifying integration with existing cloud-based data storage, analysis, and applications (e.g., the risk assessment system described herein). When added to an existing industrial automation system, device 1002 can communicate with the cloud platform and send identification and configuration information in the form of device model 1006 to the cloud platform. Information provided by device model 1006 can be maintained in a device profile (e.g., device profile 306 of FIG. 3) stored on the industrial device 1002.

Device model 1006 can be received by a device management component 1014 on cloud platform 1008, which then updates the customer's device data 806 based on the device model 1006. In this way, cloud based analysis systems can leverage the device model to integrate the new device into the greater system as a whole. This integration can include updating cloud-based applications to recognize the new device, adding the new device to a dynamically updated data model of the customer's industrial enterprise or plant, making other devices on the plant floor aware of the new device, or other such integration functions. Once deployed, some data items defined by device model 1006 can be collected by cloud-based data collection systems, and in some embodiments can be monitored by the cloud-based system on a near real-time basis.

Device model 1006 can comprise such information as a device identifier (e.g., model and serial number), status information for the device, a currently installed firmware version, device setup data, device warranty specifications, calculated and anticipated KPIs associated with the device (e.g., mean time between failures), device health and diagnostic information, device documentation, or other such parameters.

Figure 11:
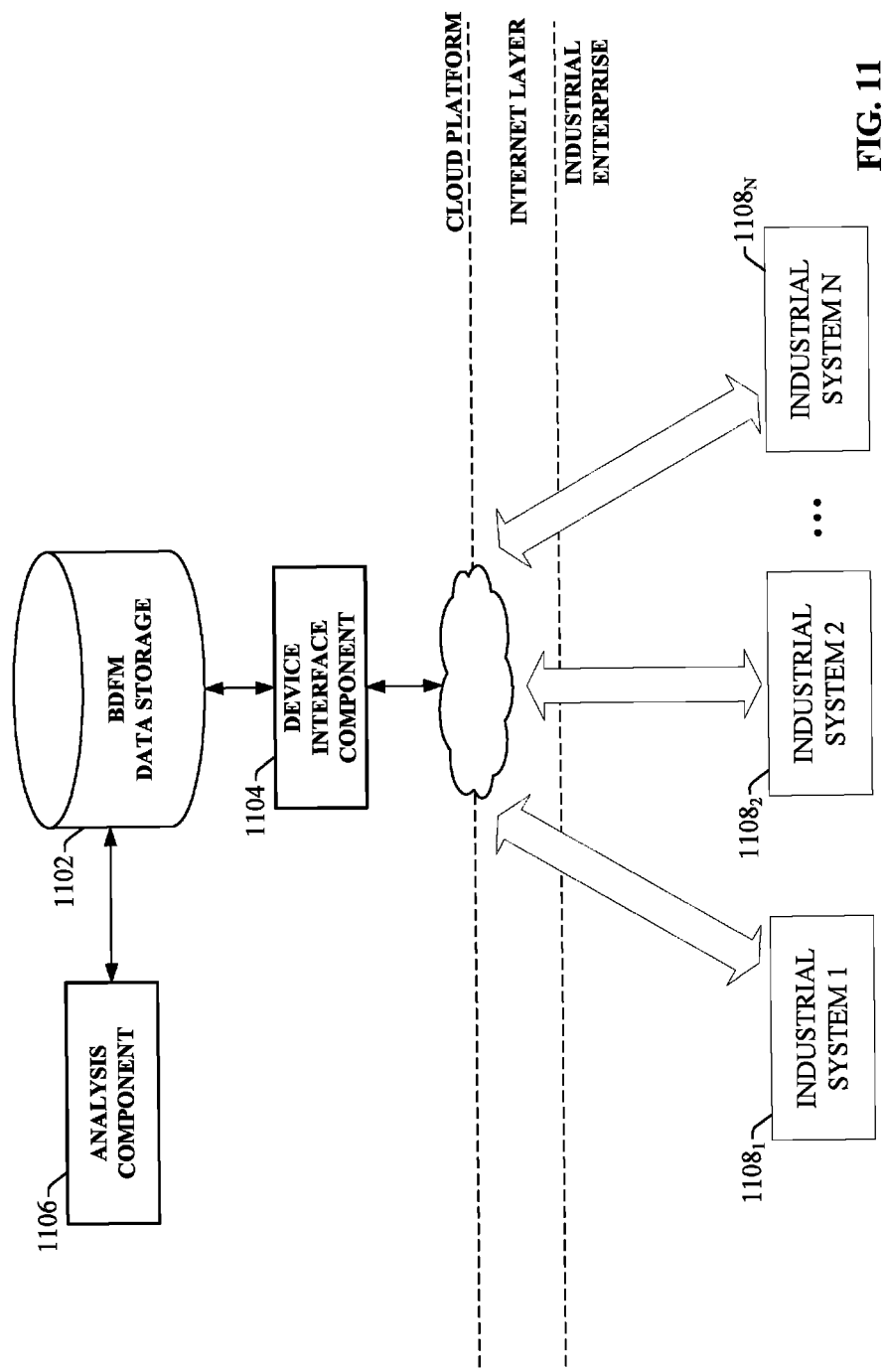
FIG. 11 illustrates collection of industrial data into cloud-based Big Data for Manufacturing (BDFM) data storage for analysis.

In addition to maintaining individual customer-specific data stores for each industrial enterprise, the cloud-based analytics services can also feed sets of customer data to a global data storage (referred to herein as Big Data for Manufacturing, or BDFM, data storage) for collective big data analysis in the cloud. As illustrated in FIG. 11, a device interface component 1104 on the cloud platform can collect data from devices and assets comprising respective different industrial systems 1108 for storage in cloud-based BDFM data storage 1102. In some embodiments, data maintained in BDFM data storage 1102 can be collected anonymously with the consent of the respective customers. For example, customers may enter into a service agreement with a technical support entity whereby the customer agrees to have their device and asset data collected in the cloud platform in exchange for cloud-based analytics services (e.g., predictive maintenance services, risk assessment services, plant modeling services, real-time asset monitoring, etc.). The data maintained in BDFM data storage 1102 can include all or portions of the classified customer-specific data described in connection with FIG. 8, as well as additional inferred data. BDFM data storage 1102 can organize the collected data according to device type, system type, application type, applicable industry, or other relevant categories. An analysis component 1106 can analyze the resulting multi-industry, multi-customer data store to learn industry-specific, device-specific, and/or application-specific trends, patterns, thresholds, etc. In general, analysis component 1106 can perform big data analysis on the multi-enterprise data maintained BDFM data storage to learn and characterize operational trends or patterns as a function of industry type, application type, equipment in use, asset configurations, device configuration settings, or other such variables.

For example, it may be known that a given industrial asset (e.g., a device, a configuration of device, a machine, etc.) is used across different industries for different types of industrial applications. Accordingly, analysis component 1106 can identify a subset of the global data stored in BDFM data storage 1102 relating to the asset or asset type, and perform analysis on this subset of data to determine how the asset or asset type performs over time for each of multiple different industries or types of industrial applications. Analysis component 1106 may also determine the operational behavior of the asset over time for each of different sets of operating constraints or parameters (e.g. different ranges of operating temperatures or pressures, different recipe ingredients or ingredient types, etc.). By leveraging a large amount of historical data gathered from many different industrial systems, analysis component 1106 can learn common operating characteristics of many diverse configurations of industrial assets at a high degree of granularity and under many different operating contexts.

Additionally, analysis component 1106 can learn a priori conditions that often presage impending operational failures or system degradations based on analysis of this global data. The knowledge gleaned through such analysis can be leveraged to detect and identify early warning conditions indicative of future system failures or inefficiencies for a given customer's industrial system, identify possible modifications to the customer's industrial assets that may improve performance (e.g., increase product throughput, reduce downtime occurrences, etc.), or other such services. In some embodiments, analysis component 1106 can compare operational behavior of similar industrial applications across different device hardware platform or software configuration settings, and make a determination regarding which combination of hardware and/or configuration settings yield preferred operational performance. Moreover, analysis component 1106 can compare data across different verticals to determine whether system configurations or methodologies used at one vertical could beneficially be packaged and implemented for another vertical. Cloud-based services could use such determinations as the basis for customer-specific recommendations. In general, BDFM data storage 1102, together with analysis component 1106, can serve as a repository for knowledge capture and best practices for a wide range of industries, industrial applications, and device combinations.

Figure 12:
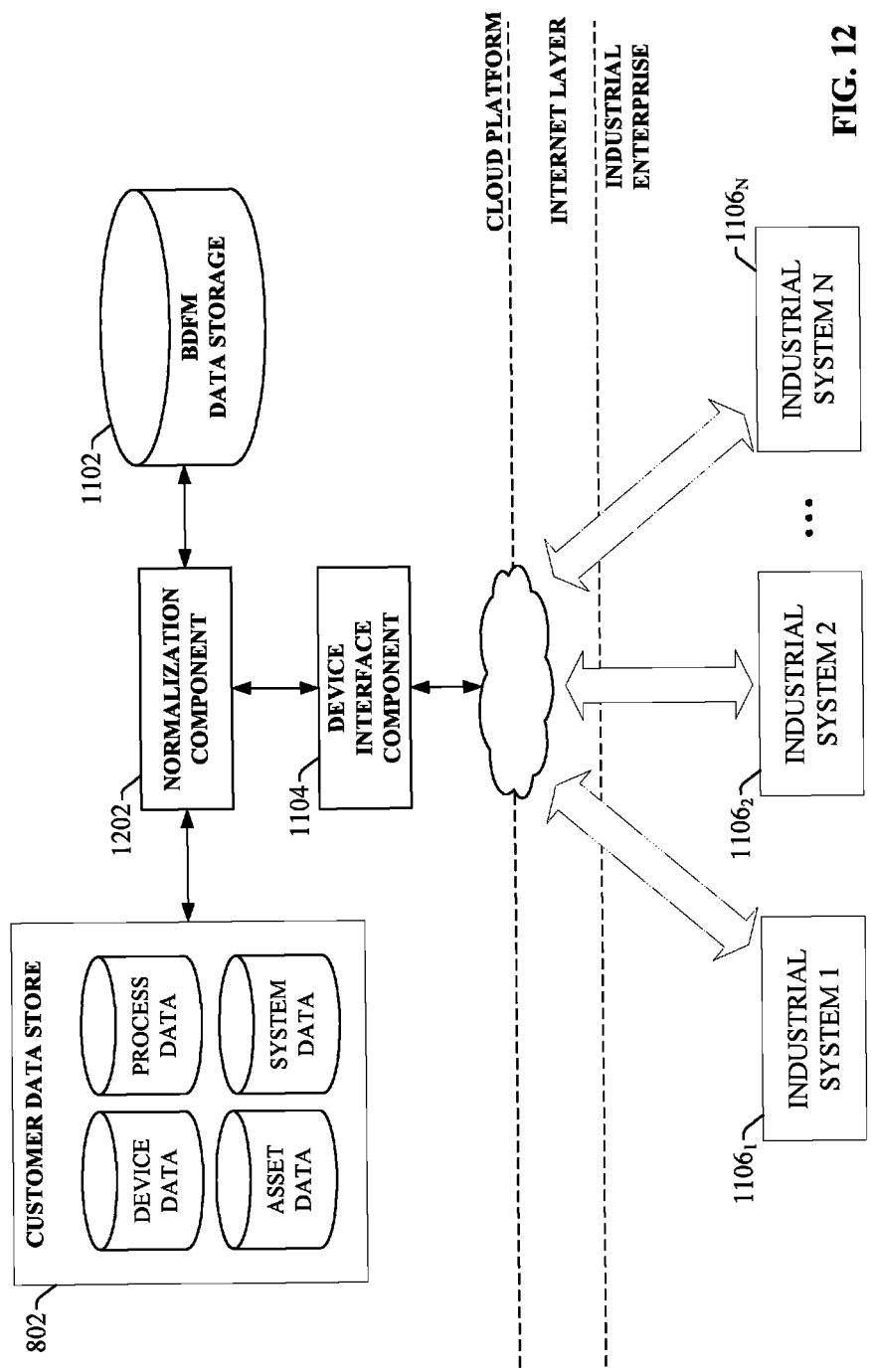
FIG. 12 illustrates a system for normalizing industrial data collected from multiple data sources for collective analysis in a cloud platform.

As noted above, some embodiments of the cloud-based analysis system described herein may require data from different sources to be normalized in order to facilitate collective analysis. To this end, plant floor devices such as industrial controller 302 of FIG. 3 may be configured to normalize their generated data to conform to a common standard and/or format prior to migrating the data to the cloud. Alternatively, as illustrated in FIG. 12, normalization of the data can be performed on the cloud platform after migration of the data. In such embodiments, a normalization component 1202 can receive the collected multi-enterprise data from device interface component 1104 and normalize the data according to the required format before moving the data to BDFM data storage 1102 and/or customer data store 802.

Figure 13:
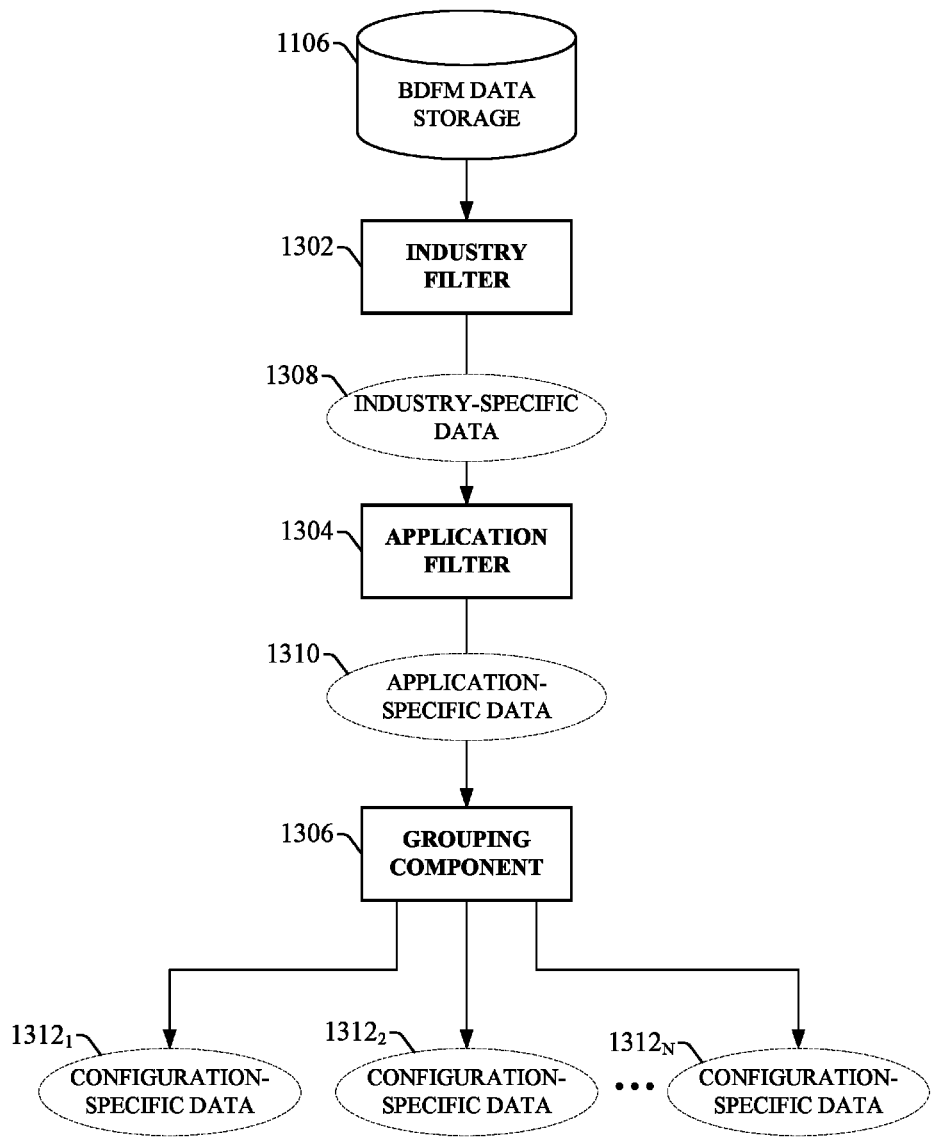
FIG. 13 illustrates an example data processing technique implemented by cloud-based analytics services to facilitate industry-specific and application-specific trend analysis.

FIG. 13 illustrates an example data processing technique that can be implemented by cloud-based analytics services to facilitate industry-specific and application-specific trend analysis. In this example, analysis component 1106 may comprise an industry filter 1302, an application filter 1304, and a grouping component 1306. A user may wish to compare performance metrics for different industrial asset configurations that perform a common industrial application (e.g., a particular pharmaceutical batch process, automotive die casting process, etc.). Since similar sets of industrial devices may be used to carry out similar applications in different industries or verticals (e.g., food and drug, plastics, oil and gas, automotive, etc.), the analytics system can identify subsets of BDFM data that were collected from systems in the relevant industry. This can yield more accurate analysis results, since a given industrial asset configuration—comprising a particular set of industrial devices, firmware revisions, etc.—may demonstrate different behavior depending on the industry or vertical in which the asset is used.

Accordingly, industry filter 1302 identifies a subset of the BDFM data collected from industrial assets in the relevant industry. The relevant subset of industry-specific data can be identified, for example, based on information in the customer model 804 associated with each customer data store 802 (see FIG. 8), which can identify the industry or vertical with which each customer is associated.

The industry-specific data 1308 comprising the subset of BDFM data relating to the industry of interest can then be filtered by application filter 1304, which identifies a subset of the industry-specific data 1308 relating to a particular industrial application (e.g., a specific batch process, motor control application, control loop application, barcode tracking application, etc.) within that industry. The resulting application-specific data 1310 comprises data (e.g., operational data, abnormal or downtime data, product throughput data, energy consumption data, etc.) collected from multiple industrial assets at different industrial enterprises that perform the specified industrial application within the industry of interest. The industrial assets represented by application-specific data, while carrying out a common industrial application, may comprise different asset configurations (e.g., different device combinations, different software code, different firmware versions or operating systems, etc.).

In order to identify trends or operating characteristics as a function of the different asset configurations, a grouping component 1306 can segregate application-specific data 1310 into groups of configuration-specific data 1312. Grouping component 1306 can group the data according to any suitable asset configuration variable, including but not limited to device model, device configuration settings, firmware version, software code executed on one or more industrial devices comprising the industrial assets, or other variable asset characteristics. Grouping the application-specific data in this manner results in N groups of data, where each group comprises data collected from multiple similarly configured industrial assets/devices that perform a specific industrial application within a specified industry or vertical. Each group can comprise data from multiple industrial enterprises and customers, so that analysis component 1106 can identify configuration-specific performance trends, propensity for device failures, downtime patterns, energy consumption, operating costs, or other such performance metrics as a function of the configuration aspect selected as the grouping criterion.

Filtering and grouping the BDFM data in this manner allows particular asset configurations to be isolated and analyzed individually (e.g., using machine learning, data mining, or other analysis technique) so that asset performance trends can be identified for various asset configurations. These results can then be compared across the sets of configuration-specific data in order to characterize these learned performance metrics as a function of the variable asset configurations corresponding to the configuration-specific groups. This analysis allows the cloud-based analysis system to generate asset configuration recommendations to specific customers, as will be discussed in more detail below.

Figure 14:
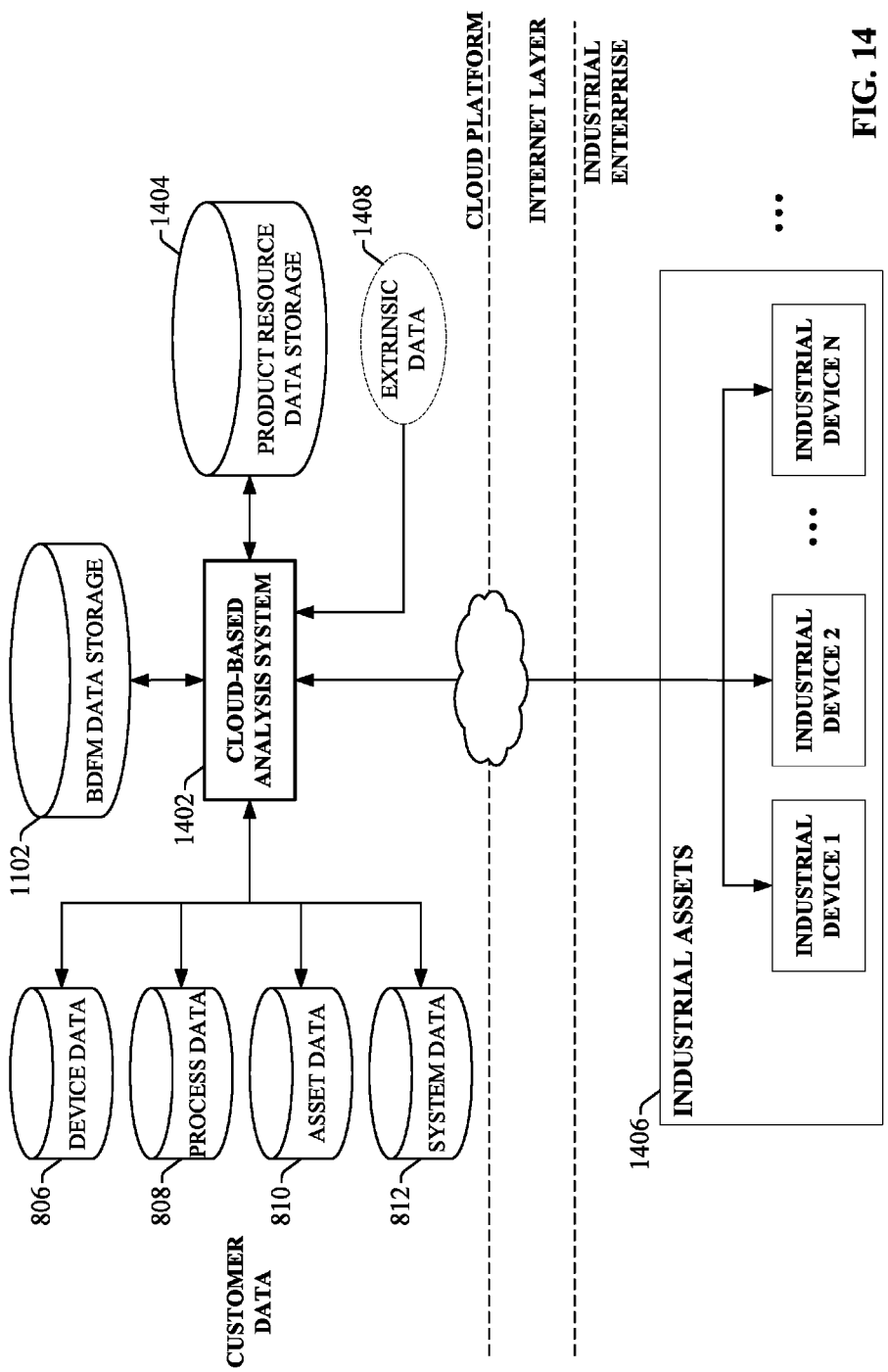
FIG. 14 illustrates a cloud-based system for providing industrial analysis services.

FIG. 14 illustrates a cloud-based system for providing industrial analysis services. As noted above, cloud-based analysis system 1402 can collect, maintain, and monitor customer-specific data (e.g. device data 806, process data 808, asset data 810, and system data 812) relating to one or more industrial assets 1406 of an industrial enterprise. In addition, the analysis system 1402 can collect and organize industrial data anonymously (with customer consent) from multiple industrial enterprises in BDFM data storage 1102 for collective analysis, as described above in connection with FIG. 11.

Analysis system 1402 can also maintain product resource information in cloud-based product resource data storage 1404. In general, product resource data storage 1404 can maintain up-to-date information relating to specific industrial devices or other vendor products. Product data stored in product resource data storage 1404 can be administered by one or more product vendors or original equipment manufacturers (OEMs). Exemplary device-specific data maintained by product resource data storage 1404 can include product serial numbers, most recent firmware revisions, preferred device configuration settings and/or software for a given type of industrial application, or other such vendor-provided information.

Additionally, one or more embodiments of cloud-based analysis system 1402 can also leverage extrinsic data 1408 collected from sources external to the customer's industrial enterprise, but which may have relevance to operation of the customer's industrial systems. Example extrinsic data 1408 can include, for example, energy cost data, material cost and availability data, transportation schedule information from companies that provide product transportation services for the customer, market indicator data, web site traffic statistics, information relating to known information security breaches or threats, or other such information. Cloud-based analysis system can retrieve extrinsic data 1408 from substantially any data source; e.g., servers or other data storage devices linked to the Internet, cloud-based storage that maintains extrinsic data of interest, or other sources.

The system depicted in FIG. 14 can provide analysis services to subscribing customers (e.g., owners of industrial assets 1406). For example, customers may enter an agreement with a product vendor or technical support entity to allow their system data to be gathered and fed anonymously into BDFM data storage 1102 (that is, the customer's system data is stored in BDFM storage 1102 without linking the system data to the customer's identity), thereby expanding the store of global data available for collective analysis. In exchange, the vendor or technical support entity can agree to provide customized data analysis services to the customer (e.g., predictive maintenance notifications, real-time system monitoring, automated email alerting services, automated technical support notification, risk assessment, etc.). Alternatively, the customer may subscribe to one or more available cloud analytics services, and optionally allow their system data to be maintained in BDFM data storage 1102. In some embodiments, a customer may be given an option to subscribe to cloud analytics services without permitting their data to be stored in BDFM data storage 1102 for collective analysis with data from other systems. In such cases, the customer's data may only be maintained as customer data (e.g., in customer data store 802) for the purposes of providing customized analysis and notification services, and the collected customer data will be analyzed in view of BDFM data storage 1102 and product resource data storage 1404 without being migrated to BDFM data storage for long-term storage and collective analysis. In another exemplary agreement, customers may be offered a discount on cloud analytics services in exchange for allowing their system data to be anonymously migrated to BDFM data storage 1102 for collective analysis.

Figure 15:
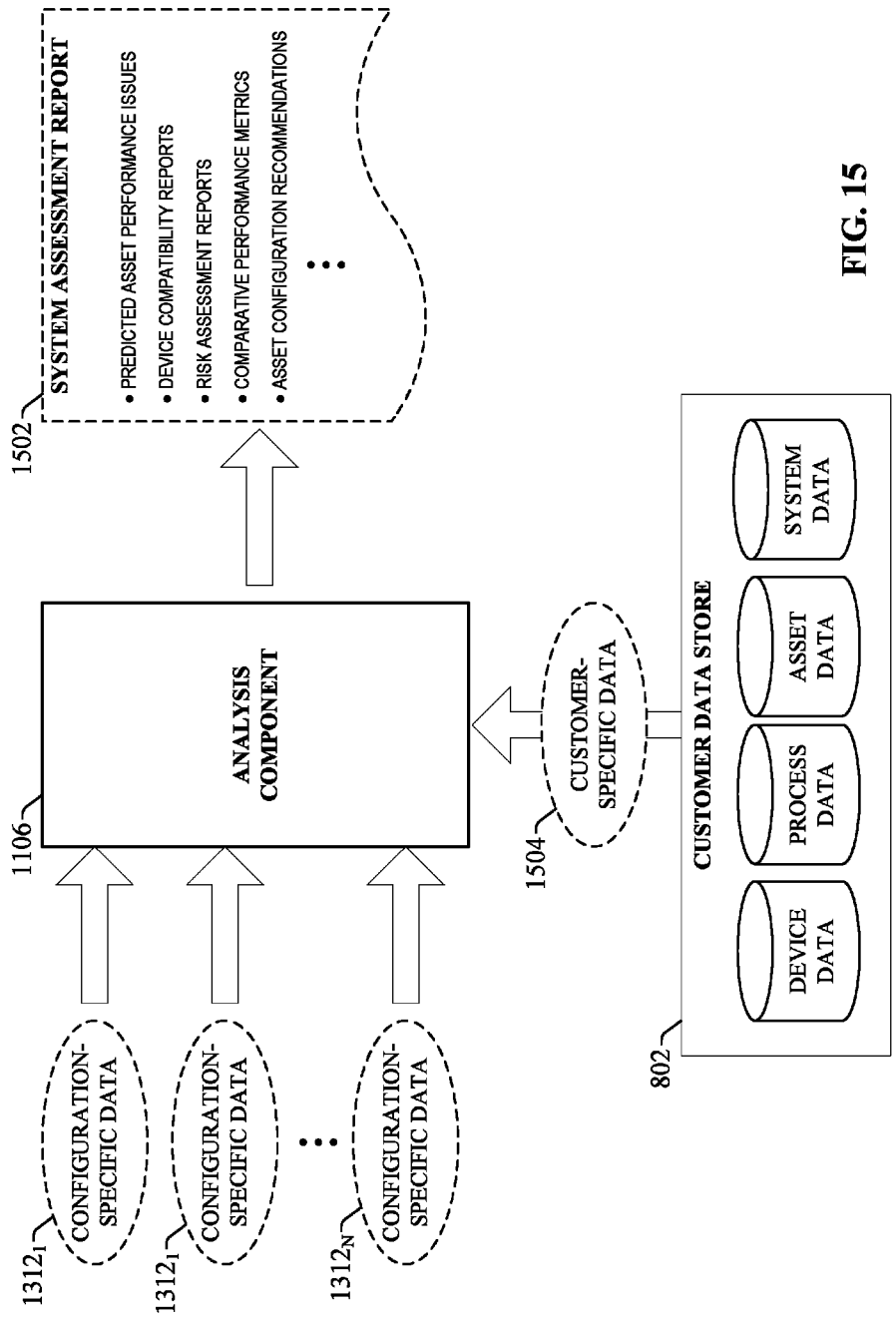
FIG. 15 illustrates generation of a system assessment report based on comparative analysis of customer-specific data with multi-enterprise on a cloud platform.

Since the cloud-based analysis system 1402 maintains accurate and detailed documentation of each customer's devices, assets, and system configurations on cloud storage, analysis system 1402 can generate customized system configuration recommendations based on comparison of the user's system configuration and/or performance data with multi-enterprise data collected in BDFM data storage 1102. FIG. 15 depicts generation of a system assessment report 1502 based on comparative analysis of customer-specific data 1504 from a customer data store 802 with multi-enterprise data collected and maintained in BDFM data storage on the cloud platform. As described above, customer-specific data 1504 can include information characterizing one or more of the customer's industrial assets, including but not limited to the industrial devices in use and their functional relationship to one another, the customer's industry, an industrial application being carried out by the industrial assets (e.g., a particular batch process, a lot traceability function, an assembly operation, a control loop, etc.), performance metrics measured over time for the assets, etc.

In this example, an analysis component 1106 executing as a service on the cloud platform analyzes the customer-specific data 1504 in view of the groups of configuration-specific data 1312 identified using the techniques described above in connection with FIG. 13. For example, customer-specific data 1504 may comprise data collected from a particular industrial asset or system for performing a common industrial application within a particular industry (e.g., a batch process in the customer's plastics facility). Accordingly, industry filter 1302 can identify a subset of the multi-enterprise data maintained in BDFM data storage 1102 collected from plastics industries, and application filter 1304 can further filter this industry-specific data to isolate data relating to the batch process of interest. Grouping component 1306 can then aggregate subsets of this application-specific data according to a selected configuration aspect (e.g., device models that make up the assets, firmware versions loaded on one or more of the devices, one or more device parameter settings, etc.). This filtering and grouping process results in groups of configuration-specific data 1312, where each group corresponds to a different value or setting of the selected configuration aspect.

Analysis component 1106 can then analyze customer-specific data 1504 to determine which configuration group most closely aligns with the customer's particular asset configuration. For example, if the configuration-specific data 1312 is grouped according to firmware version, such that each group corresponds to a different firmware version installed on a particular device, analysis component 1106 can determine which firmware version is being used by the customer (e.g., based on the device data maintained on the customer data store 802), and match the customer-specific data to the group of configuration-specific data corresponding to this firmware version. In this way, analysis component 1106 identifies a subset of configuration and performance data collected from systems that are broadly similar to the customer's industrial assets. Leveraging this vast set of multi-enterprise data allows analysis component 1106 to generate customized predictions and recommendations relevant to the customer's particular industrial assets.

For example, analysis component 1106 can generate a system assessment report 1502 identifying predicted asset performance issues based on analysis of the configuration-specific data group identified as being analogous to the customer's system. In this scenario, analytics component may infer, based on the relevant configuration-specific data group, that devices using the same firmware version in use at the customer's facility for similar industrial applications experience a relatively high number of downtime occurrences or compatibility issues with other devices. Accordingly, system assessment report 1502 can identify these predicted asset performance and device compatibility issues as potential concerns. In another example, system assessment report 1502 can comprise a risk assessment report that identifies one or more potential risk factors associated with the customer's system based on analysis of the relevant configuration-specific data 1312. Such risk factors can include, for example, risk of device failure or degraded performance, safety risks, lost revenue opportunities, risks of inventory shortage, network security risks, etc. For each identified risk factor, the risk assessment report can also include a description of possible effects that realization of the risk factor may have on the customer's overall operation, possible financial impact, and/or one or more risk aversion recommendations for mitigating the risk factor.

By virtue of the configuration-specific data groupings identified by the cloud-based analysis system, analysis component 1106 can also compare the user's industrial asset configurations with other alternative configurations for implementing the same industrial application (e.g., configurations corresponding to other configuration-specific data groups). Continuing with the firmware example described above, analysis component 1106 may determine, based on comparison of performance data across the configuration-specific data groups, that systems using a different firmware version relative to the version currently installed on the user's system generally experience fewer downtime occurrences, experience greater product throughput, consume less energy, etc. Based on this observation, system assessment report may include a recommendation to install the preferred firmware version on the appropriate industrial device. System assessment report 1502 can also recommend other configuration modifications using similar techniques (e.g., replacement of an existing device to a different device model, modification of existing parameter settings, reconfiguration of a portion of the plant network, etc.).

In another example, configuration-specific data 1312 may be grouped according to program code used to execute the industrial application, thereby allowing analysis component to compare performance metrics for the different groups as a function of program code. Accordingly, customer-specific data 1504 may include information relating to the program code in use on the customer's particular system. Based on this information, analysis component 1106 can compare the code in use at the customer facility with alternative programs used at other facilities to determine whether one of these alternative programming may improve performance of the customer's system. These alternative programs can be identified in system assessment report 1502.

Figure 16:
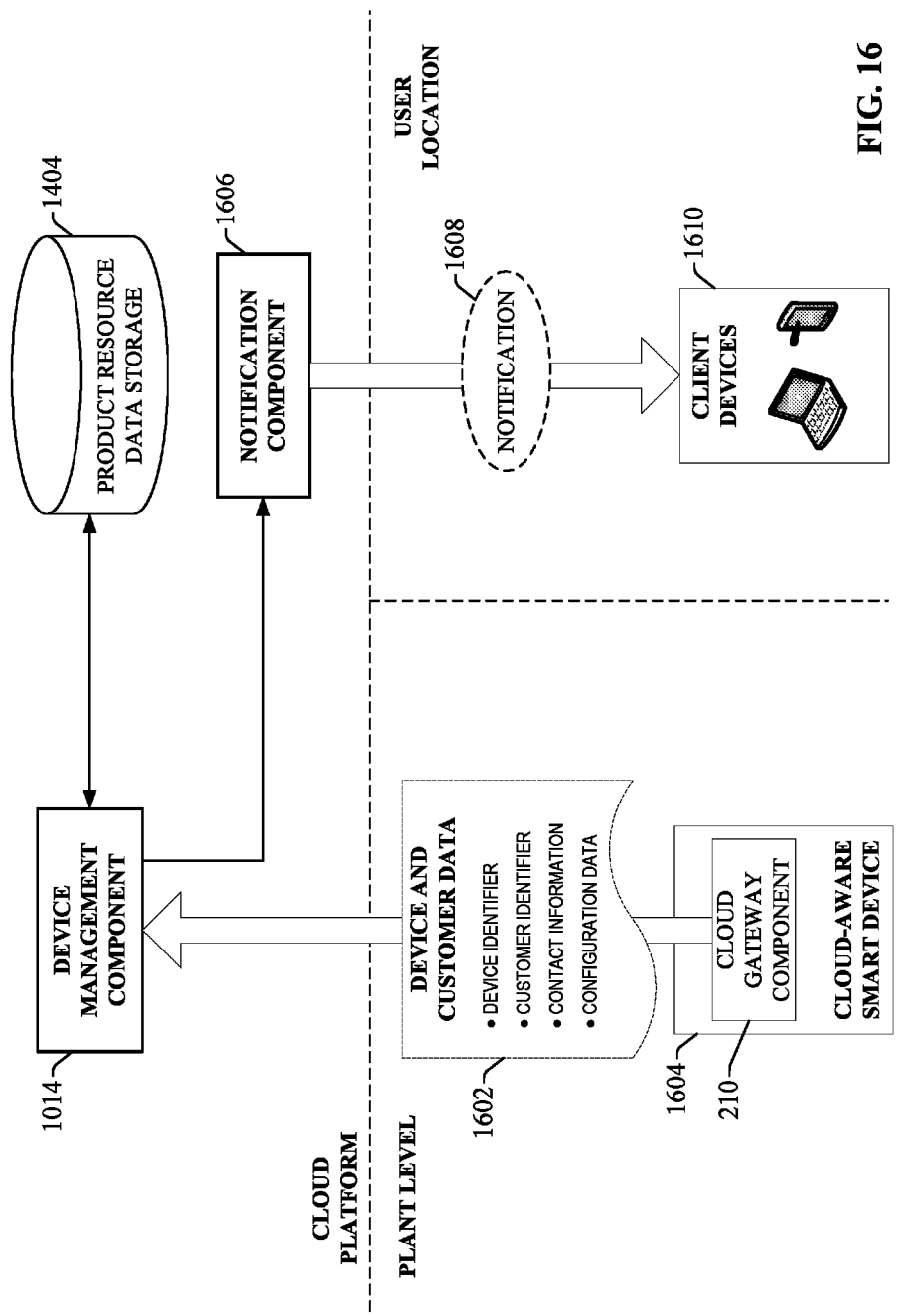
FIG. 16 illustrates a cloud-based system for generating automated notifications of device upgrade opportunities.

In addition to the features discussed above, one or more embodiments can provide cloud-based device management services that assist users with device upgrade notification and management. FIG. 16 illustrates a cloud-based system for generating automated notifications of device upgrade opportunities. In one or more embodiments, users may enter an agreement with a provider of the device management services to allow their basic device data to be collected and monitored in the cloud-platform in exchange for automated alerting services. Such agreements may allow the user (e.g., the owner of the industrial assets being monitored) to select from one or more device management options, including but not limited to firmware upgrade notifications, configuration management recommendations, program upload and compare services, or other device management services.

Based on the service agreement, one or more devices of the user's industrial assets—e.g., cloud-aware smart device 1604—can provide device and customer data 1602 to the cloud platform using techniques described above. For example, cloud-aware smart device 1604 can be similar to industrial controller 302 of FIG. 3, such that device 1604 maintains a device profile 306 and a customer profile 308. Device 1604 can provide at least a portion of the data stored in these profiles to the cloud platform using cloud gateway component 210. This data can include, but is not limited to, a device identifier (e.g., device model number), a customer identifier, contact information for the customer (e.g., email addresses for plant personnel who should be notified in the event of a detected upgrade opportunity or configuration recommendation), configuration data for the device (e.g., a firmware version, parameter settings, program code, etc.), or other such information.

Device management component 1014 can receive this device and customer data 1602 in the cloud platform, and cross-reference this data with product version data maintained in product resource data storage 1404. For example, device management component 1014 may submit the device identifier received from the smart device 1604 to product resource data storage 1404 to determine whether a newer version of the device is currently available, or of a newer firmware version is available for the device. Since product resource data storage 1404 is kept up-to-date with the most recent product availability information, device management component 1014 is able compare the user's current device information with the product availability information on a near real-time basis, and notify the user when an upgrade opportunity is detected. If a newer device or firmware version is detected, device management component 1014 can instruct a notification component 1606 to send a notification to one or more client devices 1610 specified by the contact information provided in device and customer data 1602 (or specified on customer model 804).

Figure 17:
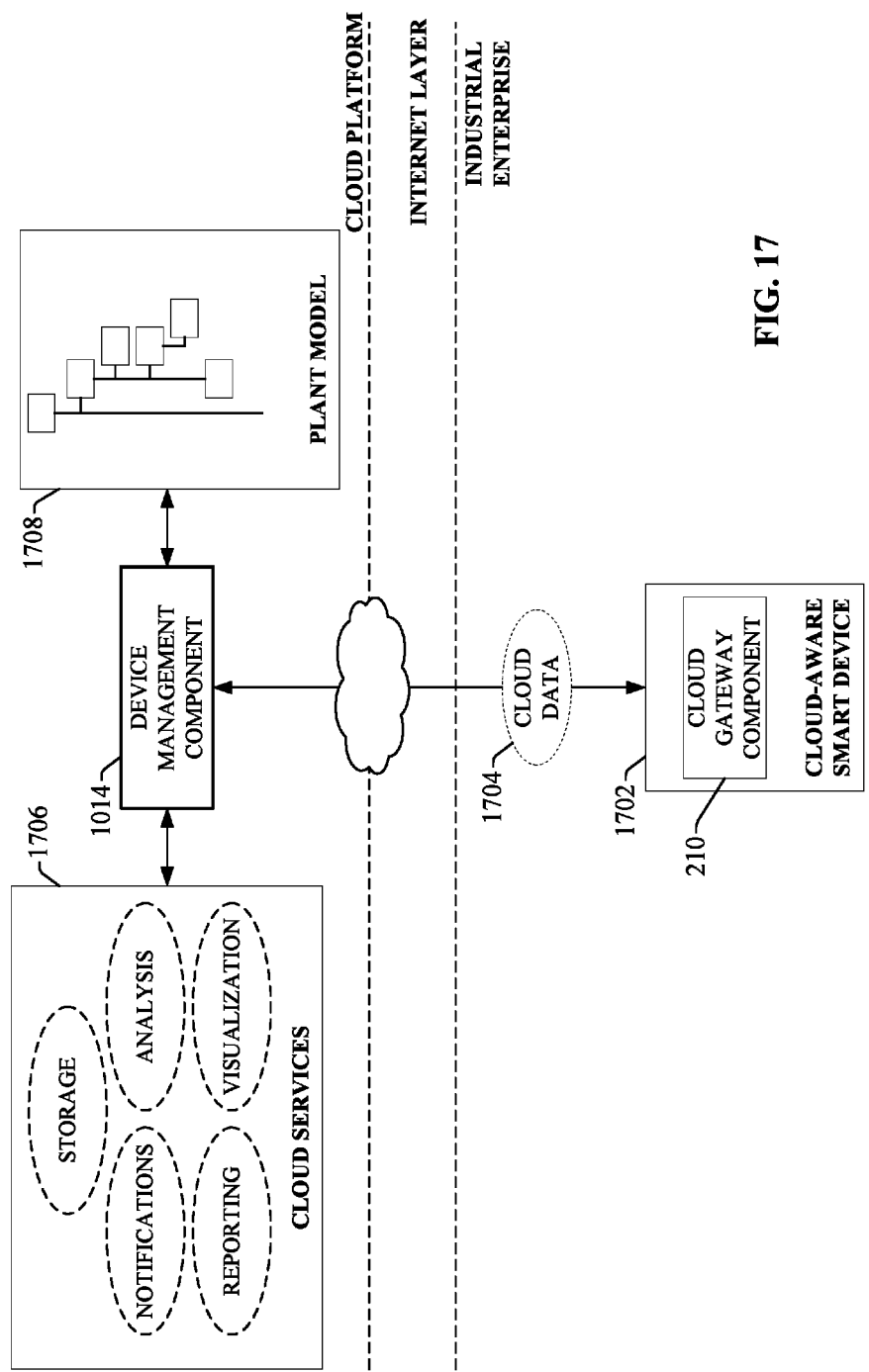
FIG. 17 illustrates automatic integration of a cloud-aware smart device within a larger device hierarchy.

To facilitate accurate system analysis that considers not only the devices in use at a customer facility, but also the relationships between the devices and their context within the larger enterprise, some embodiments of the cloud-based analysis system can maintain a plant model for a given industrial enterprise based on the data collected as described above. To this end, services executing on the cloud platform can facilitate automatic integration of new or existing industrial devices into the plant model. Pursuant to an example, FIG. 17 illustrates automatic integration of a cloud-aware smart device within a larger device hierarchy. In this example, a cloud-aware smart device 1702 installed as part of an industrial automation system within an industrial enterprise communicates with a cloud platform through an Internet layer. In some scenarios, cloud gateway component 210 can initiate communication with the cloud platform upon installation and power-up of cloud-aware smart device, where the particular cloud platform or cloud-based application with which the device communicates is specified in a configuration file associated with the device. Once communication is established, cloud-aware smart device 1702 can begin exchanging cloud data 1704 with the cloud platform. Although cloud gateway component 210 is depicted in FIG. 17 as exchanging cloud data 1704 directly with the cloud platform, in some scenarios cloud gateway component 210 may communicate with the cloud platform via a separate cloud gateway or other proxy device, as described above.

In the present example, cloud-aware smart device 1702 communicates with device management component 1014 running on the cloud platform. Device management component 1014 can maintain a plant model 1708 that models the industrial enterprise and devices therein. Plant model 1708 can represent the industrial enterprise in terms of multiple hierarchical levels, where each level comprises units of the enterprise organized as instances of types and their properties. Exemplary types can include, for example, assets (e.g., pumps, extruders, tanks, fillers, welding cells, utility meters, etc.), structures (e.g., production lines, production areas, plants, enterprises, production schedules, operators, etc.), and processes (e.g., quality audit, repairs, test/inspection, batch, product parameters, shifts, etc.).

Plant model 1708 allows devices of an automation system and data items stored therein to be described and identified in terms of these hierarchical levels, allowing a common terminology to be used across the entire enterprise to identify devices and data associated with those devices. Thus, individual items of device data (e.g., live analog and digital values stored in controller tags, archived data values stored in a historian register or other long-term data storage device, etc.), when integrated into plant model 1708, can be identified and viewed by other applications using unique tags defined by plant model 1708. Plant model 1708 can represent industrial controllers, devices, machines, or processes as data structures (e.g., type instances) within this organizational hierarchy to provide context for data generated and stored throughout the enterprise relative to the enterprise as a whole.

Device management component 1014 can leverage device model information provided by cloud-aware smart device 1702 to facilitate auto-discovery of the smart device and creation of corresponding data structures representing the smart device in plant model 1708. For example, when cloud-aware smart device 1702 is added to an industrial system of an enterprise, the device's cloud gateway component 210 can send information from device profile 306 to device management component 1014 on the cloud platform. Device management component 1014 can thereby automatically detect the device and determine the device's context within the organizational hierarchy modeled by plant model 1708, and reconfigure plant model 1708 to incorporate the newly added device at the appropriate location within the organizational hierarchy. This can include identifying data tags available within cloud-aware smart device and making those data tags available for viewing or retrieval by authorized applications using the hierarchical naming structure defined by plant model 1708.

In some embodiments, cloud-aware smart device 1702 can generate a portion of the device hierarchy represented by plant model 1708, and provide this information to the cloud platform to facilitate accurately representing this portion of the device hierarchy within plant model 1708. For example, if cloud-aware smart device 1702 is an industrial controller that monitors and/or controls one or more production areas, the smart industrial controller can generate a hierarchical representation of the production areas, production lines, workcells, etc. of which it has knowledge, as well as devices associated therewith (e.g., 110 devices or subservient control systems that interface with the industrial controller). Cloud gateway component 210 can provide this portion of the enterprise hierarchy to the cloud platform, and device management component 1014 can update plant model 1708 accordingly. Data provided by cloud-aware smart device 1702, together with plant model 1708, can be leveraged by any suitable cloud services 1706 residing on the cloud platform, including the cloud-based analysis services described herein.

Figure 18:
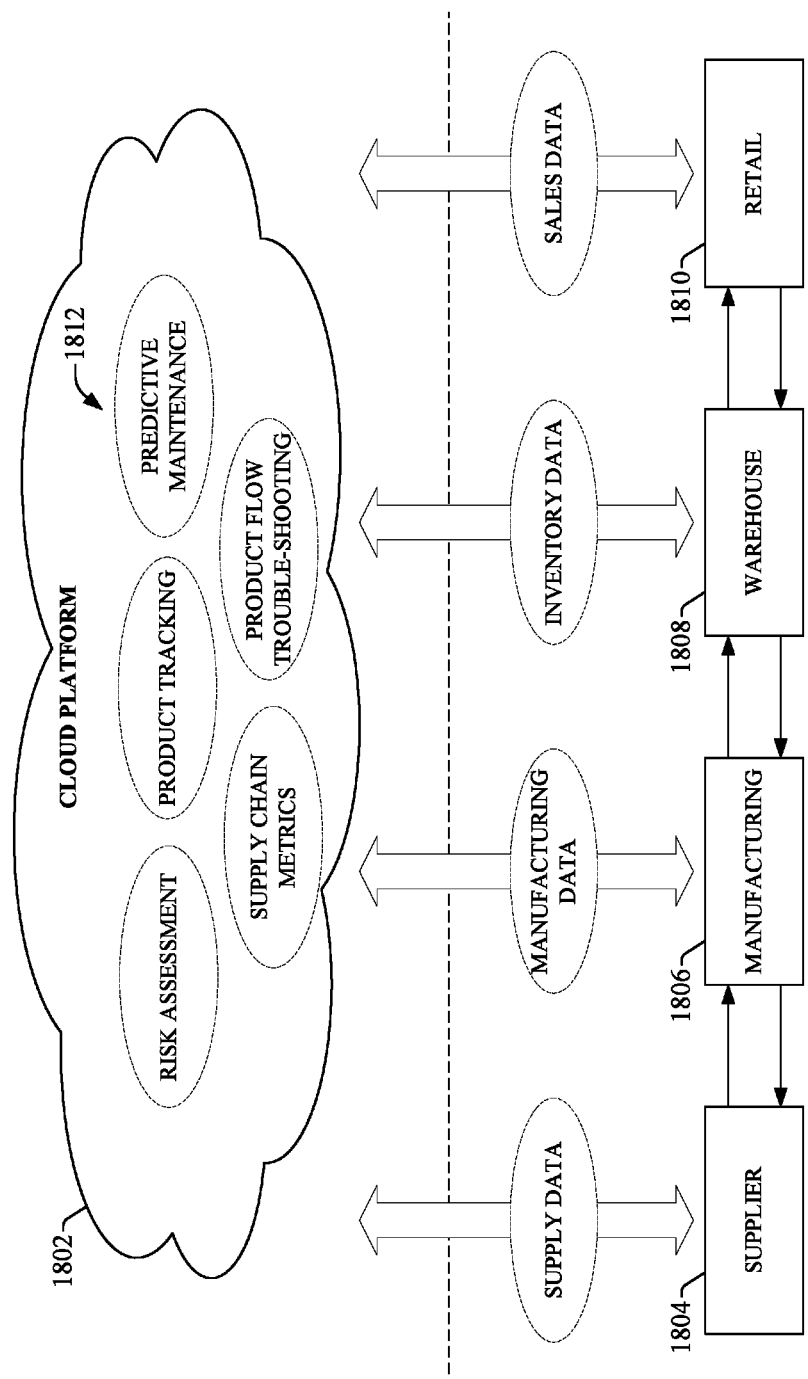
FIG. 18 illustrates an example cloud-based architecture for collecting product data through an industrial supply chain and identifying correlations and relationships across the supply-chain.

Since the cloud-based analysis services described herein can associate geographically diverse data with a customer identifier (e.g., customer model 804) and aggregate this data in a cloud platform, the system can take advantage of the large amounts of diverse data from all stages of a supply chain to identify factors at one stage that impact quality or performance elsewhere in the chain. This can include collection and analysis of data from material or parts suppliers, distributors, inventory, sales, and end-user feedback on the finished product. FIG. 18 illustrates an exemplary cloud-based architecture for tracking product data through an industrial supply chain and identifying correlations and relationships across the supply-chain. A simplified supply chain can include a supplier 1804, a manufacturing facility 1806, a warehouse 1808, and a retail entity 1810. However, the supply chain can comprise more or fewer entities without departing from the scope of this disclosure. For simplicity, FIG. 18 depicts a single block for each supply chain entity. However, it is to be appreciated that a given supply chain can comprise multiple entities for each entity type. For example, a manufacturing facility may rely on materials provided by multiple suppliers. Likewise, the supply chain may include multiple warehouse entities to provide storage for various products produced by the manufacturing facility, shared distribution centers, and multiple retail entities for selling the products to end customers.

The various supply chain entities can generate a large amount of data in connection with their roles in the supply chain. For example, supplier 1804 and manufacturing facility 1806 can include plant floor devices that generate near real-time and historical industrial data relating to production of the materials or products, as well as business-level information relating to purchase orders, intakes, shipments, enterprise resource planning (ERP), and the like. Warehouse 1808 can maintain records of incoming and outgoing product, product quality constraints such as storage temperatures, and current inventory levels for respective products. Retail entity 1810 can track sales, retail inventory, lost or damaged product, financial information, demand metrics, and other such information. Additional information relating to transportation of materials or products between stages of the supply chain can also be generated, including but not limited to geographical location obtained from global positioning systems.

According to one or more embodiments, data sources associated with each of the supply chain entities can provide industrial or business data to cloud platform 1802 to facilitate cloud-based tracking of products through the supply chain and prediction of potential quality issues. Cloud platform 1802 can execute a number of services that aggregate and correlate data provided by the various supply chain stages, and provide information about a product's state within the supply chain based on the analysis. These cloud-based services can include, but are not limited to, tracking the product's physical location within the supply chain, providing metrics relating to the flow of products through the supply chain, or identifying and trouble-shooting current and predicted inefficiencies in product flows through the supply chain.

In a non-limiting example, cloud-based services 1812 may note a spike in negative feedback from purchasers of the end product (e.g., based on survey data collected from retail entity 1810). Using analytics similar to those described in previous examples, cloud-based analysis services can trace the cause of the reported quality issue to changes made to an upstream process of the supply chain, such as a new material supplier 1804 providing an inferior ingredient, an equipment upgrade at the manufacturing facility 1806 that may have had an impact on product quality, or other such factor. Analysis at the supply-chain level can involve analysis over longer durations than those involve for plant-level or batch-level troubleshooting, since supply-chain characteristics are characterized by data collected throughout the supply chain workflow.

In addition to the analytics features described above, collection of a customer's device, asset, process, and system data in the cloud platform in association with a customer model establishes a framework for other types of services. For example, a cloud-based advertising system can generate target advertisements based on a customer's current devices in service, known customer preferences stored in the customer model, or other factors obtainable from the customer's data store. Such advertisements could direct customers to alternative devices that could replace, supplement, or enhance their existing equipment.

Moreover, the volume of customer-specific data and diverse global data gathered and maintained by the cloud-based analytics system can be leveraged to generate reports that offer multi-dimensional views of a customer's industrial assets and processes. For example, based on analysis of the data maintained in the customer data stores, the cloud-based services can calculate or anticipate customer-specific KPIs for a given industrial system or asset. Additionally, reports can be generated that benchmark these customer-specific KPIs against the global, multi-customer data set maintained in the BDFM data store.

As noted above in connection with FIG. 14, the various types of cloud-side analyses described above can correlate extrinsic data 1408 with the customer-specific and multi-enterprise data in order to provide recommendations, alerts, or other information to the customer regarding the configuration or operation of their industrial assets. In this regard, cloud-based analysis system can learn relationships between extrinsic data 1408 and operation of the customer's industrial system, and identify aspects of the customer's operations that may be a partial function of events outside the industrial enterprise or supply chain. For example, extrinsic data 1408 may comprise, in part, current health statistics collected from a medical database. The medical database may comprise a server maintained by a government health organization that is publicly accessible via the Internet, or may comprise cloud-based storage that maintains publically accessible health statistics. Based on analysis of this extrinsic data, analysis component 1106 may identify an increase in reported influenza cases for a geographical location within a customer's retail area. Accordingly, the cloud-based analysis system may predict an increase in demand for a relevant pharmaceutical product manufactured by the customer's pharmaceutical enterprise. Based on further analysis of collected customer data (e.g., device data 806, process data 808, asset data 810, and/or system data 812), analysis component 1106 may determine that the current inventory level maintained by the customer may be insufficient to meet the expected elevated demand, and report this possible inventory shortage via system assessment report 1502 (which may also include a recommendation to increase production of the pharmaceutical product to a level expected to satisfy the anticipated demand).

In another example, extrinsic data 1408 may comprise current energy or material cost information. Analysis component 1106 may factor this cost information into a cost-benefit analysis, together with the collected customer data, in order to determine whether revenue for the industrial enterprise would be substantially optimized by increasing or lowering the current rate of production (e.g., scheduling more or fewer shifts, curtailing operations during peak energy demand hours, etc.). In other non-limiting, industry-specific examples, analysis component 1106 may predict an increase in demand for certain pet supplies (e.g., pet food or accessories) based on an observed rise in the number of pet adoptions, or may predict a rise in demand for infant products (e.g., formula, diapers, etc.) based on a detected rise in the number of child births (given birth statistics received as extrinsic data 1408).

FIGS. 19-23 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 19:
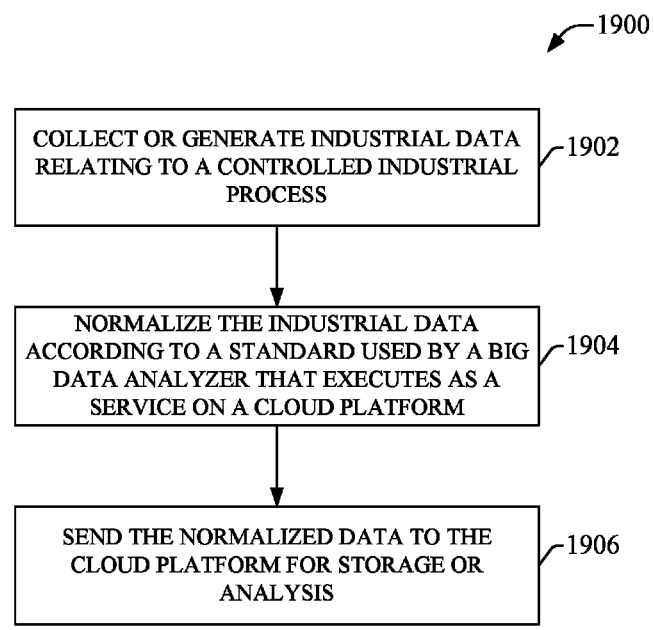
FIG. 19 is a flowchart of an example methodology for sending data from an industrial device to a cloud platform for cloud-based analysis.

FIG. 19 illustrates an example methodology 1900 for sending data from an industrial device to a cloud platform for cloud-based analysis. Initially, at 1902, industrial data relating to a controlled industrial process is collected or generated. In one or more embodiments, the industrial data is generated by an industrial device (e.g., an industrial controller, telemetry device, motor drive, HMI terminal, vision system, etc.) that is communicatively linked to a cloud platform and that subsequently provides the data to the cloud. Alternatively, the data is collected from multiple industrial devices by a cloud proxy device (e.g., a stand-alone cloud-aware server, a firewall box or other network infrastructure device, etc.).

At 1904, the industrial data is normalized to conform to a standard or format required by a big data analyzer that executes as a service on the cloud platform. At 1906, the normalized data is sent to the cloud platform for storage and/or analysis by the big data analyzer.

Figure 20:
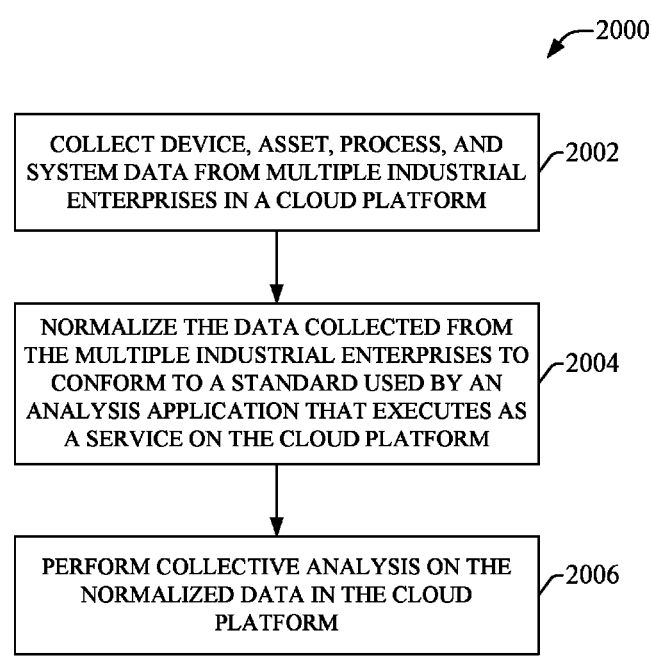
FIG. 20 is a flowchart of an example methodology for performing collecting analysis on industrial data collected from multiple devices across multiple industrial facilities.

FIG. 20 illustrates an example methodology 2000 for performing collecting analysis on industrial data collected from multiple devices across multiple industrial facilities. Initially, at 2002, industrial data is collected from multiple industrial enterprises in a cloud platform. This can comprise collecting one or more of device, asset, process, and/or system data from industrial devices and assets across the enterprises. At 2004, the data collected at step 2002 is normalized in the cloud platform to conform to a standard used by an analysis application that executes as a service on the cloud platform. At 2006, collective analysis is performed on the normalized data in the cloud platform. Such collective analysis can include, for example, learning and identifying asset performance trends as a function of system configuration, predicting impending device failures or operational inefficiencies, identifying risk factors inherent in certain system configurations, inferring lifecycle data for particular industrial devices, building interactive models of an industrial system, or other types of analysis.

Figure 21:
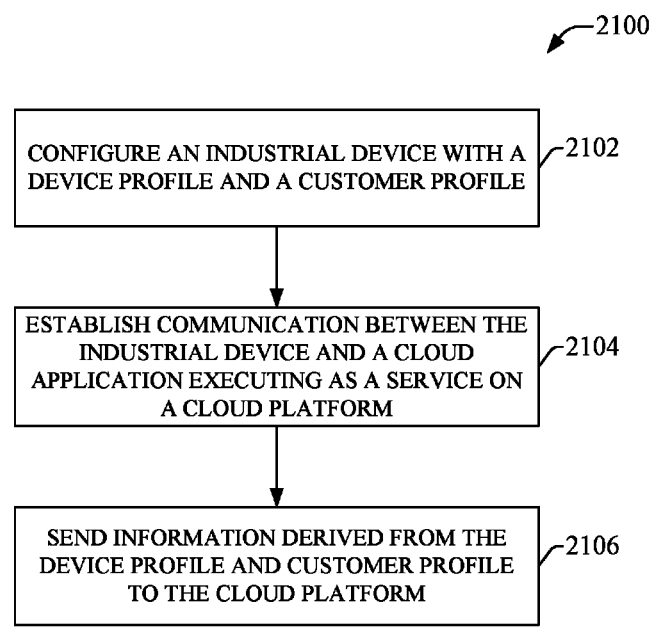
FIG. 21 is a flowchart of an example methodology for providing device and customer information to a cloud platform for use by cloud-based services.

FIG. 21 is an example methodology for providing device and customer information to a cloud platform for use by cloud-based services. Initially, at 2102, an industrial device is configured with a device profile and a customer profile. The device profile maintains current information that characterizes the industrial device, including but not limited to a device identifier (e.g., model number), vendor information, current firmware version, current parameter settings, a context of the device within its industrial environment (e.g., other devices that are communicatively linked to the industrial device), and/or other such information. The customer profile stores customer-specific information regarding an owner of the industrial device, including a customer identifier, contact information for relevant plant personnel (e.g., email addresses, phone numbers, etc.), a relevant industry that is the focus of the customer's industrial enterprise (e.g., automotive, oil and gas, food and drug, mining, etc.), and/or other customer-specific information.

At 2104, communication is established between the industrial device and a cloud-based application executing as a service on a cloud platform. In one or more embodiments, the industrial device may include a cloud gateway that communicatively links the industrial device to the cloud platform. The cloud gateway may be configured to automatically detect the cloud-based application upon deployment of the device on a plant network, and to establish communication with the application upon detection. At 2106, the industrial device sends information derived from the device profile and the customer profile to the cloud-based application via the communicative link established at step 2104.

Figure 22:
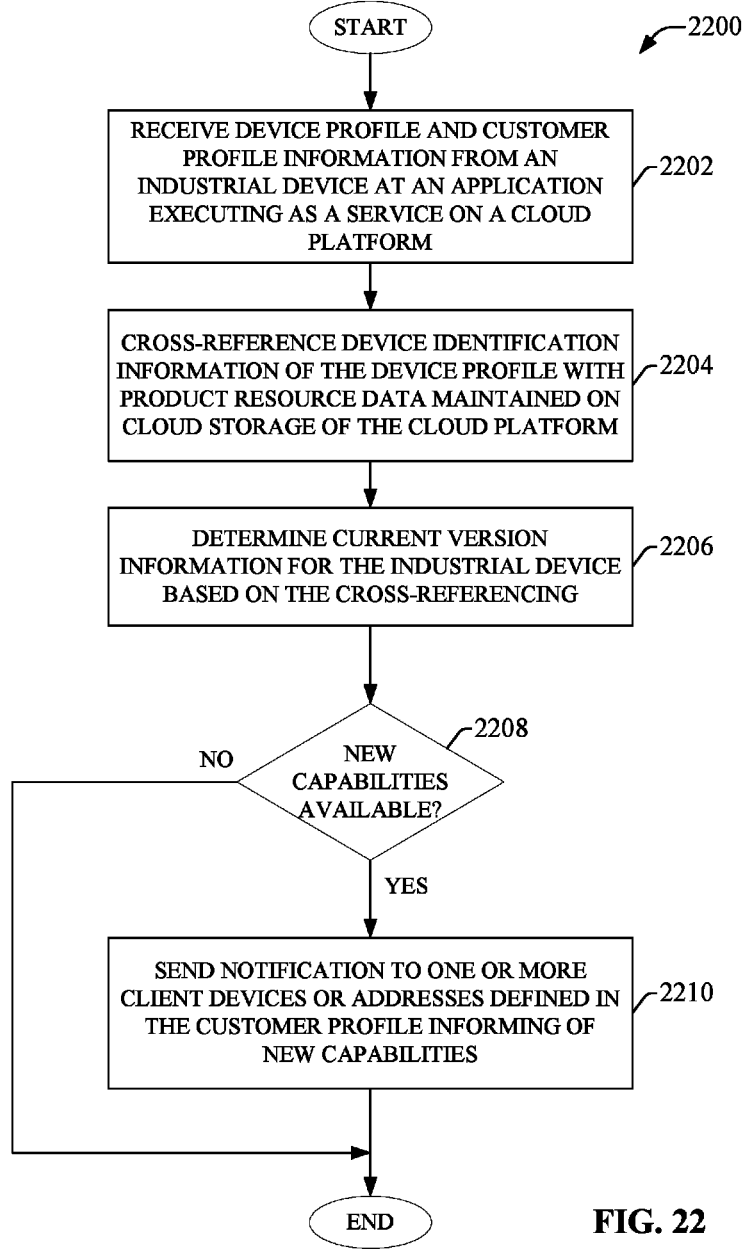
FIG. 22 is a flowchart of an example methodology for providing device management services using cloud-based services.

FIG. 22 is an example methodology for providing device management services using cloud-based services. Initially, at 2202, device profile and customer profile information is received at a cloud-based application from an industrial application. The device profile and customer profile information can be provided to the cloud platform using the methodology depicted in FIG. 21 and described above. At 2204, device identification information retrieved from the device profile information is cross-referenced with product resource data maintained on cloud storage of the cloud platform. The product resource data can include version and upgrade information for multiple industrial devices (e.g., available device models, most recent firmware versions, operating system updates, etc.).

At 2206, current version information for the industrial device corresponding to the device identification information is determined based on the cross-referencing of step 2204. At 2208, a determination is made regarding whether new capabilities are available for the industrial device. This can include determining whether a newer version of the device is available, whether a more recent firmware version is available for the device, whether software upgrades are available, etc. If no new capabilities are available, the methodology ends. Alternatively, if new capabilities are identified ("YES" at step 2208), a notification is sent to one or more client devices or addresses defined in the customer profile information, informing plant personnel of the identified capabilities. For example, the cloud-based device management application can notify a user that a new firmware version is available for the device, that a newer version of the device is available, etc. The notification may also include instructions for obtaining the new capabilities (e.g., a website from which the new firmware version can be downloaded, a vendor from which the new device model can be purchased, etc.).

Figure 23:
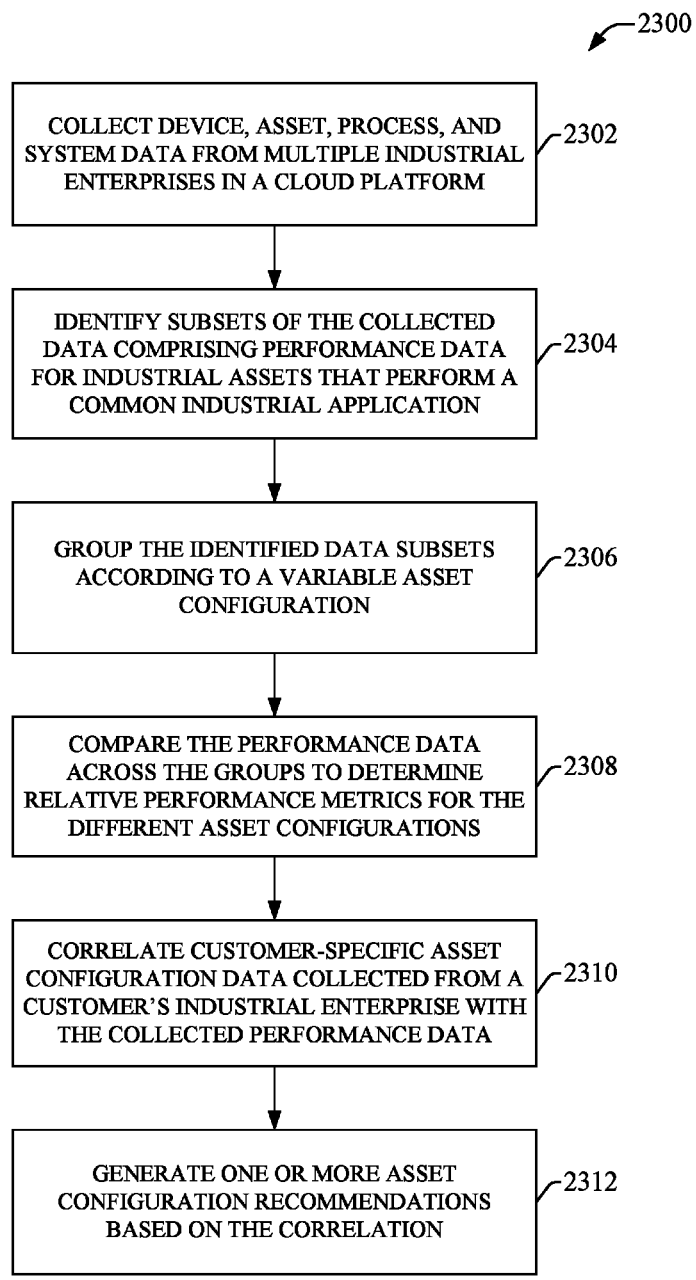
FIG. 23 is a flowchart of an example methodology for generating asset configuration recommendations or notifications based on cloud-based comparative analysis with multi-enterprise data.

FIG. 23 illustrates an example methodology 2300 for generating asset configuration recommendations or notifications based on cloud-based comparative analysis with multi-enterprise data. Initially, at 2302, industrial data is collected in a cloud platform from multiple industrial enterprises. The industrial data can comprise one or more of device, asset, process, and system data, as described in previous examples. At 2304, subsets of the collected data comprising performance data for industrial assets that perform a common industrial application are identified. For example, a cloud-based analysis system can identify subsets of the collected data corresponding to collections of industrial equipment that perform a particular batch process, where the respective subsets are collected from multiple industrial assets that perform the batch process but which comprise different sets of devices, device configurations, software code, etc. The analysis system may also further identify a subset of this application-specific data corresponding to a particular industry (e.g., automotive, oil and gas, food and drug, textiles, etc.).

At 2306, the identified data subsets are grouped according to a variable asset configuration. For example, the cloud-based analysis system can group together data subsets corresponding to industrial assets that include a particular device model, firmware version, network configuration, configuration parameter, or other variable configuration aspect. In this way, each data group represents performance data for the industrial application as a function of the variable configuration aspect.

At 2308, the performance data is compared across the groups established in step 2306, in order to determine relative performance metrics for the different asset configurations as a function of the variable configuration aspect. At 2310, customer-specific asset data collected from a particular customer's industrial enterprise is correlated with the collected performance data. For example, the customer-specific data can be cross-referenced with the performance data groups established at step 2306 in view of the performance comparisons made at step 2308. At 2312, one or more asset configuration recommendations are generated based on the correlation of step 2310. For example, the cloud-based analysis system may determine, based on the customer-specific asset configuration data, that the customer's equipment configuration for performing the industrial application generally corresponds to the variable configuration aspect for one of the identified groups (step 2306), and is therefore expected to experience similar performance characteristics identified for that group based on the analysis performed at step 2308. Accordingly, the analysis system can generate a recommendation that the customer alter the current asset configuration to more closely conform to a configuration associated with a different data group that demonstrates improved performance relative to the customer's current configuration (e.g., a recommendation to change a parameter setting, a recommendation to use a different firmware version, a recommendation to replace a particular device with a different model known or inferred to result in improved performance, etc.). In some embodiments, the analysis system can also provide positive confirmation that the user's current system configuration generally conforms to that identified as yielding best performance.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 24:
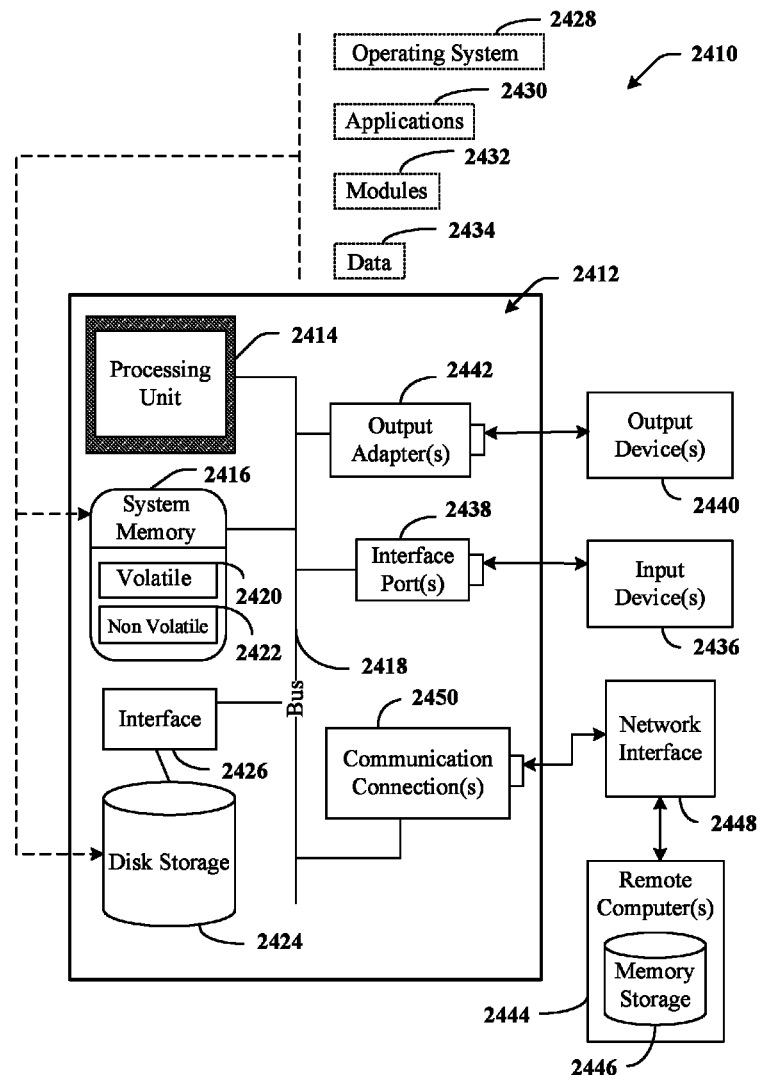
FIG. 24 is an example computing environment.
Figure 25:
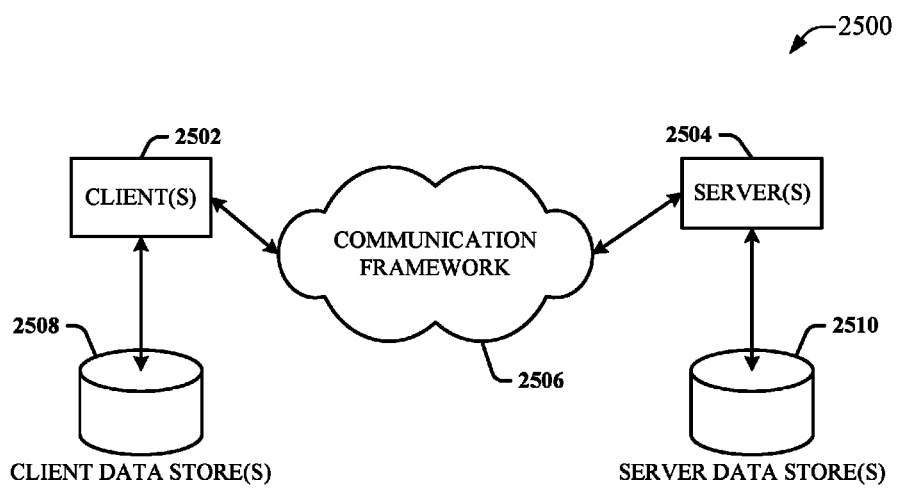
FIG. 25 is an example networking environment.

In order to provide a context for the various aspects of the disclosed subject matter, FIGS. 24 and 25 as well as the following discussion are intended to provide a brief, general description of a suitable environment in which the various aspects of the disclosed subject matter may be implemented.

With reference to FIG. 24, an example environment 2410 for implementing various aspects of the aforementioned subject matter includes a computer 2412. The computer 2412 includes a processing unit 2414, a system memory 2416, and a system bus 2418. The system bus 2418 couples system components including, but not limited to, the system memory 2416 to the processing unit 2414. The processing unit 2414 can be any of various available processors. Multi-core microprocessors and other multiprocessor architectures also can be employed as the processing unit 2414.

The system bus 2418 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2416 includes volatile memory 2420 and nonvolatile memory 2422. The basic input/output system (BIOS), containing the basic routines to transfer information between elements within the computer 2412, such as during start-up, is stored in nonvolatile memory 2422. By way of illustration, and not limitation, nonvolatile memory 2422 can include read only memory (ROM), programmable ROM (PROM), electrically programmable ROM (EPROM), electrically erasable PROM (EEPROM), or flash memory. Volatile memory 2420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2412 also includes removable/non-removable, volatile/non-volatile computer storage media. FIG. 24 illustrates, for example a disk storage 2424. Disk storage 2424 includes, but is not limited to, devices like a magnetic disk drive, floppy disk drive, tape drive, Jaz drive, Zip drive, LS-100 drive, flash memory card, or memory stick. In addition, disk storage 2424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2424 to the system bus 2418, a removable or non-removable interface is typically used such as interface 2426.

It is to be appreciated that FIG. 24 describes software that acts as an intermediary between users and the basic computer resources described in suitable operating environment 2410. Such software includes an operating system 2428. Operating system 2428, which can be stored on disk storage 2024, acts to control and allocate resources of the computer 2412. System applications 2430 take advantage of the management of resources by operating system 2428 through program modules 2432 and program data 2434 stored either in system memory 2416 or on disk storage 2424. It is to be appreciated that one or more embodiments of the subject disclosure can be implemented with various operating systems or combinations of operating systems.

A user enters commands or information into the computer 2412 through input device(s) 2436. Input devices 2436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2414 through the system bus 2418 via interface port(s) 2438. Interface port(s) 2438 include, for example, a serial port, a parallel port, a game port, and a universal serial bus (USB). Output device(s) 2440 use some of the same type of ports as input device(s) 2436. Thus, for example, a USB port may be used to provide input to computer 2412, and to output information from computer 2412 to an output device 2440. Output adapters 2442 are provided to illustrate that there are some output devices 2440 like monitors, speakers, and printers, among other output devices 2440, which require special adapters. The output adapters 2442 include, by way of illustration and not limitation, video and sound cards that provide a means of connection between the output device 2440 and the system bus 2418. It should be noted that other devices and/or systems of devices provide both input and output capabilities such as remote computer(s) 2444.

Computer 2412 can operate in a networked environment using logical connections to one or more remote computers, such as remote computer(s) 2444. The remote computer(s) 2444 can be a personal computer, a server, a router, a network PC, a workstation, a microprocessor based appliance, a peer device or other common network node and the like, and typically includes many or all of the elements described relative to computer 2412. For purposes of brevity, only a memory storage device 2446 is illustrated with remote computer(s) 2444. Remote computer(s) 2444 is logically connected to computer 2412 through a network interface 2448 and then physically connected via communication connection 2450. Network interface 2448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2450 refers to the hardware/software employed to connect the network interface 2448 to the system bus 2418. While communication connection 2450 is shown for illustrative clarity inside computer 2412, it can also be external to computer 2412. The hardware/software necessary for connection to the network interface 2448 includes, for exemplary purposes only, internal and external technologies such as, modems including regular telephone grade modems, cable modems and DSL modems, ISDN adapters, and Ethernet cards.

FIG. 25 is a schematic block diagram of a sample computing environment 2500 with which the disclosed subject matter can interact. The sample computing environment 2500 includes one or more client(s) 2502. The client(s) 2502 can be hardware and/or software (e.g., threads, processes, computing devices). The sample computing environment 2500 also includes one or more server(s) 2504. The server(s) 2504 can also be hardware and/or software (e.g., threads, processes, computing devices). The servers 2504 can house threads to perform transformations by employing one or more embodiments as described herein, for example. One possible communication between a client 2502 and servers 2504 can be in the form of a data packet adapted to be transmitted between two or more computer processes. The sample computing environment 2500 includes a communication framework 2506 that can be employed to facilitate communications between the client(s) 2502 and the server(s) 2504. The client(s) 2502 are operably connected to one or more client data store(s) 2508 that can be employed to store information local to the client(s) 2502. Similarly, the server(s) 2504 are operably connected to one or more server data store(s) 2510 that can be employed to store information local to the servers 2504.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:
1. An industrial controller, comprising:
a memory that stores executable components;
a processor, operatively coupled to the memory, that executes the executable components, the executable components comprising:

a transformation component configured to modify raw data generated by an industrial control program executed by the industrial controller in accordance with at least one requirement of an industrial analytics application executing on a cloud platform to yield transformed data;

a customer profile component configured to append customer-specific information to the transformed data to yield profiled data, wherein the customer-specific information comprises at least a customer identifier of an industrial enterprise associated with the industrial controller, device data identifying the industrial controller, and industry data identifying a type of industry that is a focus of the industrial enterprise; and a cloud gateway component configured to send the profiled data to the industrial analytics application, wherein the industrial analytics application performs a collective analysis on the transformed data in view of other data stored on the cloud platform, and the other data is selected by the industrial analytics application as a subset of stored data corresponding to the type of industry identified by the industry data.

2. The industrial controller of claim 1, wherein the customer profile component is configured to retrieve the customer-specific information from a customer profile stored on the memory of the industrial controller.

3. The industrial controller of claim 1, wherein the device data comprises at least one of a model number of the industrial controller, a device type of the industrial controller, a current firmware version installed on the industrial controller, an identifier of an operating system installed on the industrial controller, one or more configuration parameters set for the industrial controller, a status indicator for the industrial controller, or a role identifier that identifies a role of an industrial device in an industrial process controlled by the industrial controller.

4. The industrial controller of claim 1, wherein the type of industry is at least one of an automotive industry, an oil and gas industry, a food and drug industry, a marine industry, or a textiles industry.

5. The industrial controller of claim, 1 wherein the customer-specific information comprises at least one of contact information for plant personnel to be notified in the event that the industrial analytics application identifies a notifiable issue based on analysis of the transformed data, schedule data indicating a schedule for receipt or delivery of parts or ingredients involved in an industrial process controlled by the industrial controller, ingredient identification data indicating one or more ingredients used in the industrial process, or service contract data defining a service agreement between a service provider and the industrial enterprise.

6. The industrial controller of claim 1, wherein the transformation component is further configured to determine a context of the industrial controller within a topology of devices within the industrial enterprise, and to append contextual data to the raw data describing the context.

7. The industrial controller of claim 1, wherein the transformation component is configured to transform the raw data from a first format native to the industrial controller to a second format that facilitates the collective analysis by the industrial analytics application.

8. The industrial controller of claim 1, wherein the cloud gateway component is further configured to send second profiled data received from another industrial controller to the industrial analytics application.

9. A method, comprising:

modifying, by an industrial controller comprising a processor, raw data generated by an industrial control program that is executed by the industrial controller to yield transformed data, wherein the modifying comprises modifying the raw data to conform to a requirement of an industrial analytics system executing on a cloud platform;

adding, by the industrial controller, customer-specific data to the transformed data to yield profiled data, wherein the customer-specific data comprises at least a customer identifier of an industrial enterprise associated with the industrial controller, device data identifying the industrial controller, and industry data identifying a type of industry of the industrial enterprise; and sending, by the industrial controller, the profiled data to the industrial analytics system via the cloud platform, wherein the industrial analytics system performs a collective analysis on the transformed data in view of other data stored on the cloud platform, and wherein the other data is selected by the industrial analytics system as a subset of stored data corresponding to the type of industry identified by the industry data.

10. The method of claim 9, wherein the adding comprises retrieving the customer-specific data from a customer profile stored on a memory of the industrial controller.

11. The method of claim 9, wherein the modifying comprises modifying the raw data from a first format associated with the industrial controller to a second format that facilitates the collective analysis by the industrial analytics system.

12. The method of claim 9, wherein the adding the device data comprises adding at least one of a model number of the industrial controller, a device type of the industrial controller, a current firmware version installed on the industrial controller, an identifier of an operating system installed on the industrial controller, one or more configuration parameters set for the industrial controller, a status indicator for the industrial controller, or a role identifier that identifies a role of an industrial device in an industrial process controlled by the industrial controller.

13. The method of claim 9, wherein the adding the customer-specific information comprises adding at least one of contact information for plant personnel to be notified in the event that the industrial analytics system identifies a notifiable issue based on analysis of the transformed data, schedule data indicating a schedule for receipt or delivery of parts or ingredients involved in an industrial process controlled by the industrial controller, ingredient identification data indicating one or more ingredients used in the industrial process, or service contract data defining a service agreement between a service provider and the industrial enterprise.

14. The method of claim 9, further comprising:

determining, by the industrial controller, a context of the industrial controller within a topology of devices within the industrial enterprise; and adding, by the industrial controller, contextual data to the raw data, the contextual data describing the context in terms of two or more hierarchical levels of the industrial enterprise.

15. The method of claim 14, wherein the two or more hierarchical levels comprise at least one of a workcell level, a line level, an area level, a site level, or an enterprise level.

16. The method of claim 9, further comprising:

receiving, by the industrial controller, second profiled data from another industrial controller; and sending, by the industrial controller, the second profiled data to the industrial analytics system via the cloud platform.

17. A non-transitory computer-readable medium having stored thereon executable instructions that, in response to execution, cause a computing system to perform operations, the operations comprising:
- transforming raw data generated by an industrial control program that is executed by an industrial device to yield transformed data, wherein the transforming comprises modifying the raw data to conform to a requirement of an industrial analytics application executing on a cloud platform;
- appending customer-specific data to the transformed data to yield profiled data, the customer-specific data comprising at least a customer identifier of an industrial enterprise associated with the industrial device, device information identifying the industrial device, and industry information identifying a type of industry that is a focus of the industrial enterprise; and
- sending the profiled data to the industrial analytics application via the cloud platform wherein
  - the industrial analytics system performs a collective analysis on the transformed data in view of other data stored on the cloud platform, and
  - the other data is selected by the industrial analytics system as a subset of stored data corresponding to the type of industry identified by the industry information.

18. The non-transitory computer-readable medium of claim 17, wherein the appending comprises determining the customer-specific data based on information recorded in a customer profile stored on the industrial device.

19. The non-transitory computer-readable medium of claim 17, wherein the customer-specific data further comprises at least one of a current firmware version installed on the industrial device, an identifier of an operating system installed on the industrial device, one or more configuration parameters set for the industrial device, a status indicator for the industrial device, a role identifier that identifies a role of the industrial device in an industrial process, contact information for plant personnel to be notified in the event that the industrial analytics system identifies a notifiable issue based on analysis of the transformed data, schedule data indicating a schedule for receipt or delivery of parts or ingredients involved in the industrial process controlled by the industrial device, ingredient identification data indicating one or more ingredients used in the industrial process, or service contract data defining a service agreement between a service provider and the industrial enterprise.

20. The non-transitory computer-readable medium of claim 17, wherein the operations further comprise:
- determining a context of the industrial device within a topology of devices within the industrial enterprise; and
- appending contextual data to the raw data, the contextual data describing the context in terms of two or more hierarchical levels of the industrial enterprise.

* * * * *